US012580696B2

(12) United States Patent
Hu et al.

(10) Patent No.: US 12,580,696 B2
(45) Date of Patent: Mar. 17, 2026

(54) RESOURCE UNIT COMBINATION INDICATION METHOD AND COMMUNICATION APPARATUS

(71) Applicant: Huawei Technologies Co., Ltd., Shenzhen (CN)

(72) Inventors: Mengshi Hu, Shenzhen (CN); Jian Yu, Shenzhen (CN); Ming Gan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 660 days.

(21) Appl. No.: 17/942,907

(22) Filed: Sep. 12, 2022

(65) Prior Publication Data

US 2023/0016355 A1     Jan. 19, 2023

Related U.S. Application Data

(63) Continuation of application No. PCT/CN2021/080628, filed on Mar. 12, 2021.

(30) Foreign Application Priority Data

Mar. 13, 2020    (CN) .......................... 202010177500.8

(51) Int. Cl.
*H04W 72/04*        (2023.01)
*H04L 5/00*         (2006.01)
            (Continued)

(52) U.S. Cl.
CPC ....... *H04L 5/0044* (2013.01); *H04W 72/1263* (2013.01); *H04W 80/02* (2013.01)

(58) Field of Classification Search
CPC ... H04L 5/0044; H04L 5/0007; H04L 5/0023; H04L 5/0037; H04L 5/0053;
            (Continued)

(56) References Cited

U.S. PATENT DOCUMENTS

2017/0094664 A1    3/2017  Lee et al.
2018/0184429 A1*   6/2018  Gan ...................... H04W 72/20
                    (Continued)

FOREIGN PATENT DOCUMENTS

CN        106658722 A    5/2017
CN        107534502 A    1/2018
                    (Continued)

OTHER PUBLICATIONS

Samsung, IEEE 802.11-20/0373r0, RU Allocation Subfield Design for Multi-RU Support, Mar. 9, 2020 (Year: 2020).*
Mediatek, IEEE 802.11-19/1907r0, Multiple RU Combinations for EHT, Nov. 12, 2019 (Year: 2019).*
Panasonic Corporation, IEEE 802.11-19/1868r2, Signaling Support for Multi-RU Assignment, Jan. 8, 2020 (Year: 2020).*
                    (Continued)

*Primary Examiner* — Mahbubul Bar Chowdhury
(74) *Attorney, Agent, or Firm* — Leydig, Voit & Mayer, Ltd.

(57)            ABSTRACT

A resource unit combination indication method and a communication apparatus are provided. The resource unit combination indication method includes: A transmit end generates a physical layer protocol data unit (PPDU), and sends the PPDU. The PPDU includes a resource unit allocation subfield. The resource unit allocation subfield indicates a multi-resource unit (MRU) to which a 242-tone resource unit (RU) corresponding to the resource unit allocation subfield belongs, and further indicates a quantity of user fields corresponding to the resource unit allocation subfield. According to the application, one or more users may be indicated to use a plurality of contiguous or noncontiguous RUs for data transmission, to improve RU allocation flexibility of a system and spectrum utilization of the system.

20 Claims, 15 Drawing Sheets

(51) Int. Cl.
  *H04W 72/1263* (2023.01)
  *H04W 80/02* (2009.01)
(58) Field of Classification Search
  CPC .......... H04L 27/2602; H04W 72/1263; H04W
      72/231; H04W 72/0453; H04W 80/02;
      H04W 28/06
  See application file for complete search history.

(56) References Cited

U.S. PATENT DOCUMENTS

| | | | | |
|---|---|---|---|---|
| 2019/0215213 | A1* | 7/2019 | Choi | ...................... H04L 25/38 |
| 2019/0222376 | A1* | 7/2019 | Wu | ................... H04W 72/0453 |
| 2021/0212035 | A1* | 7/2021 | Son | ....................... H04W 72/23 |
| 2021/0282146 | A1* | 9/2021 | Kim | ..................... H04L 5/0094 |
| 2023/0006786 | A1* | 1/2023 | Park | ..................... H04L 5/0044 |
| 2023/0016370 | A1* | 1/2023 | Kim | ..................... H04L 5/0053 |

FOREIGN PATENT DOCUMENTS

| | | |
|---|---|---|
| CN | 107735993 A | 2/2018 |
| CN | 110460415 A | 11/2019 |
| CN | 110768757 A | 2/2020 |
| WO | 2019240955 A1 | 12/2019 |
| WO | 2020019928 A1 | 1/2020 |

OTHER PUBLICATIONS

"Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 1: Enhancements for High Efficiency WLAN," IEEE P802.11ax™/D4.0, Total 746 pages, Institute of Electrical and Electronics Engineers, New York, New York (Feb. 2019).

"Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 1: Enhancements for High Efficiency WLAN," IEEE P802.11ax™/D4.3 (amendment to IEEE P802.11REVmd/D2.2), Total 782 pages, Institute of Electrical and Electronics Engineers, New York, New York (Aug. 2019).

"IEEE Standard for Information technology—Telecommunications and information exchange between systems Local and metropolitan area networks—Specific requirements, Part 11: Wireless LAN Medium Access Control (MAC) and Physical Layer (PHY) Specifications," IEEE Std 802.11™-2016 (Revision of IEEE Std 802.11-2012), Total 3534 pages, Institute of Electrical and Electronics Engineers, New York, New York (Approved Dec. 7, 2016).

* cited by examiner

STA 1

AP

STA 2

◄──────────── HE-SIG-B field ────────────►

| Resource unit allocation subfield 1 (the first 20 MHz) | Cyclic redundancy code+tail | User specific field |
|---|---|---|

| Resource unit allocation subfield 1 (the second 20 MHz) | Cyclic redundancy code+tail | User specific field |
|---|---|---|

FIG. 3

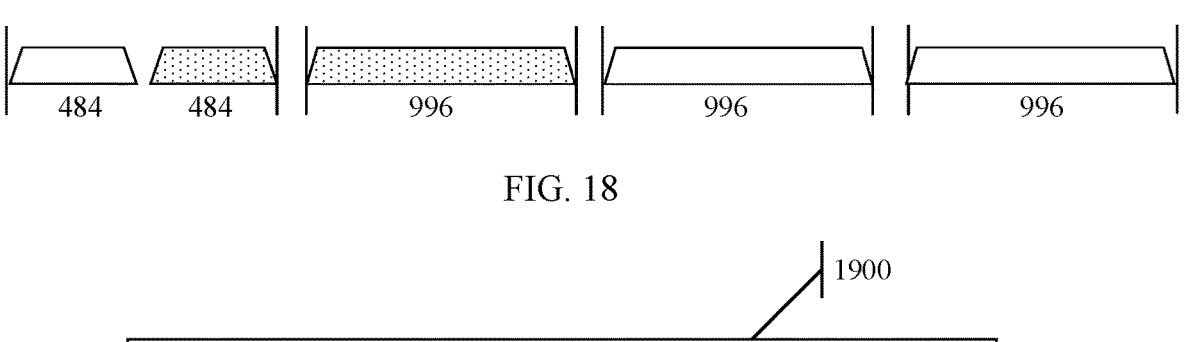
FIG. 18
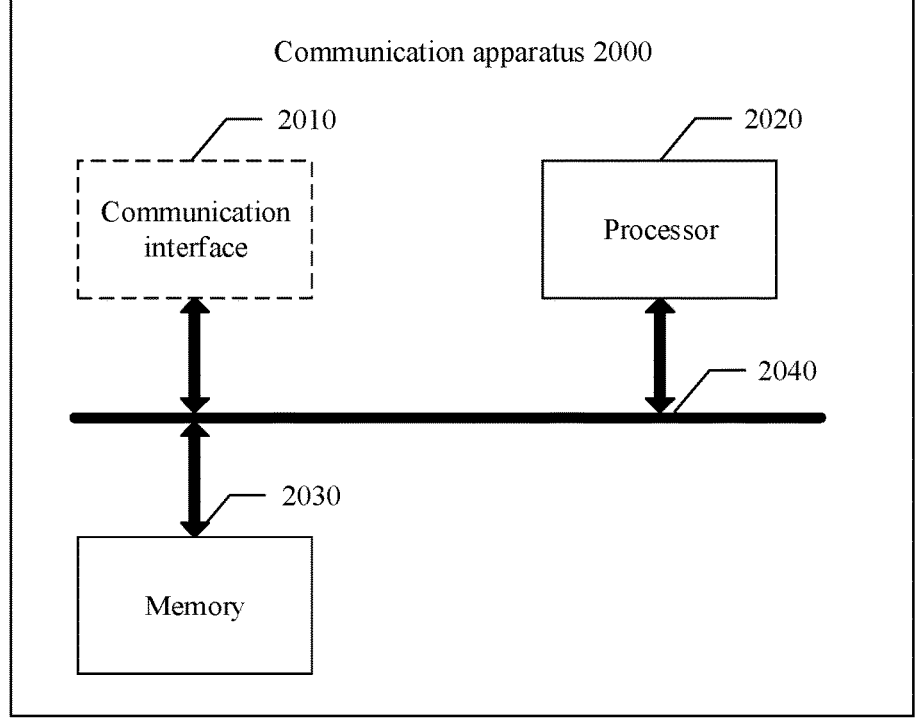
FIG. 19
FIG. 20

RESOURCE UNIT COMBINATION INDICATION METHOD AND COMMUNICATION APPARATUS

CROSS-REFERENCE TO RELATED APPLICATIONS

This application is a continuation of International Application No. PCT/CN2021/080628, filed on Mar. 12, 2021, which claims priority to Chinese Patent Application No. 202010177500.8, filed on Mar. 13, 2020. The disclosures of the aforementioned applications are hereby incorporated by reference in their entireties.

TECHNICAL FIELD

Embodiments of this application relate to the field of mobile communication technologies, and in particular, to a resource unit combination indication method and a communication apparatus.

BACKGROUND

In 802.11ax, a frequency band resource can be divided into several resource units (RU) to support orthogonal frequency division multiple access (OFDMA) transmission. Each station or each group of stations can perform transmission on only one RU. In other words, currently only one RU can be allocated to one station (STA) or a plurality of STAs. However, in the future, a plurality of RUs may be allocated to one STA or a plurality of STAs. How to indicate the one STA or the plurality of STAs to perform data transmission on the plurality of RUs is a problem that needs to be resolved.

SUMMARY

This application provides a resource unit combination indication method and a communication apparatus, to indicate one or more users to perform data transmission by using a plurality of contiguous or noncontiguous RUs, thereby improving RU allocation flexibility of a system and spectrum utilization of the system.

According to a first aspect, a resource unit combination indication method is provided. The method may be performed by a first communication apparatus. The first communication apparatus may be a communication device or a communication apparatus, for example, a chip system, that can support the communication device to implement a function required in the method. The following uses an example in which the communication device may be a transmit end and the transmit end is an access point (AP) for description. The method includes the following steps.

The AP generates a physical layer protocol data unit (PPDU), where the PPDU includes a resource unit allocation subfield, and the resource unit allocation subfield indicates an MRU to which a 242-tone RU corresponding to the resource unit allocation subfield belongs, and further indicates a quantity of user fields corresponding to the resource unit allocation subfield.

The AP sends the PPDU.

According to a second aspect, a resource unit combination indication method is provided. The method may be performed by a second communication apparatus. The second communication apparatus may be a communication device or a communication apparatus, for example, a chip system, that can support the communication device to implement a function required in the method. The following uses an example in which the communication device may be a receive end and the receive end is a station (STA) for description. The method includes the following steps.

The STA receives a physical layer protocol data unit PPDU from an AP, where the PPDU includes a resource unit allocation subfield, and the resource unit allocation subfield indicates an MRU to which a 242-tone RU corresponding to the resource unit allocation subfield belongs, and further indicates a quantity of user fields corresponding to the resource unit allocation subfield.

The STA determines the MRU based on indication information.

In this solution, one resource allocation subfield indicates an MRU to which a 242-tone RU corresponding to the resource allocation subfield belongs, and may indicate a quantity of user fields corresponding to the resource allocation subfield. In this case, a plurality of resource allocation subfields corresponding to the MRU may indicate combination into the MRU. For example, if M 242-tone RUs indicated by M resource allocation subfields belong to a same MRU, a combination manner of the MRU and a quantity of users performing transmission on the MRU may be indicated. According to this solution, combination indication of MRUs of more combination types can be implemented, so that RU allocation is more flexible.

In a possible implementation of the first aspect or the second aspect, that the resource unit allocation subfield indicates an MRU to which a 242-tone RU corresponding to the resource unit allocation subfield belongs includes:

The resource unit allocation subfield indicates a combination identifier of the MRU to which the 242-tone RU corresponding to the resource unit allocation subfield belongs.

It should be understood that if a combination identifier of an MRU to which a plurality of 242-tone RUs belong is the same, the MRU is obtained by combining the plurality of 242-tone RUs.

In a possible implementation of the first aspect or the second aspect, combination identifiers of different MRUs are the same or different, and at least two MRUs with different combination identifiers exist between two MRUs with a same combination identifier.

It should be understood that at least two MRUs with different combination identifiers exist between two MRUs with a same combination identifier means that the same combination identifier may indicate different MRUs, so that combination indication of MRUs of more combination types is implemented by using fewer combination identifiers.

In a possible implementation of the first aspect or the second aspect, different MRUs do not overlap, at least a third MRU exists between a first MRU and a second MRU that have a same combination identifier, and a combination identifier of the third MRU is different from the combination identifier of the first MRU or the second MRU.

In this solution, combination indication of MRUs of more combination types may be implemented by using fewer combination identifiers, for example, by using one or two combination identifiers.

According to a third aspect, a resource unit combination indication method is provided. The method may be performed by a first communication apparatus. The first communication apparatus may be a communication device or a communication apparatus, for example, a chip system, that can support the communication device to implement a function required in the method. The following uses an example in which the communication device may be a transmit end and the transmit end is an AP for description. The method includes the following steps.

The AP generates a PPDU. The PPDU includes first indication information and second indication information. The first indication information indicates 80 MHz in which an RU to be combined with a 996-tone RU is located. The second indication information indicates a quantity of user fields corresponding to the MRU. The MRU is obtained by combining the 996-tone RU and the to-be-combined RU in 80 MHz.

The AP sends the PPDU.

According to a fourth aspect, a resource unit combination indication method is provided. The method may be performed by a second communication apparatus. The second communication apparatus may be a communication device or a communication apparatus, for example, a chip system, that can support the communication device to implement a function required in the method. The following uses an example in which the communication device may be a receive end and the receive end is a STA for description. The method includes the following steps.

The STA receives a PPDU from an AP. The PPDU includes first indication information and second indication information. The first indication information indicates 80 MHz in which an RU that a 996-tone RU is to be combined with is located. The second indication information indicates a quantity of user fields corresponding to the MRU. The MRU is obtained by combining the 996-tone RU and the to-be-combined RU in 80 MHz.

The STA determines, based on the first indication information and the second indication information, the MRU to which the STA belongs.

For a combination indication of an MRU including a 996-tone RU, for example, the first indication information may indicate that the 996-tone RU is one RU in the MRU, that is, the 996-tone RU is combined with at least one RU, and the second indication information indicates a location of the RU combined with the 996-tone RU. The MRU including the 996-tone RU may be determined based on the first indication information and the second indication information. According to this solution, combination indication of MRUs of more combination types can be implemented, so that RU allocation is more flexible.

In a possible implementation, the PPDU includes M resource allocation subfields. It should be understood that, in this solution, the MRU including the 996-tone RU is indicated, where M is greater than or equal to 5, and the first indication information and the second indication information may be separately carried in some resource allocation subfields of the M resource allocation subfields. Specific implementations include but are not limited to the following manners.

Manner 1: The first indication information is carried in four resource unit allocation subfields corresponding to the 996-tone RU. Values of the four resource unit allocation subfields are the same, and indicate the 996-tone RU to combine with at least one RU in an ith 80 MHz, where i is greater than or equal to 1.

The second indication information is carried in N resource unit allocation subfields corresponding to the at least one RU, where N is greater than or equal to 1.

Manner 2: The first indication information is carried in four resource unit allocation subfields corresponding to the 996-tone RU. Values of the four resource unit allocation subfields are the same, and indicate the 996-tone RU to combine with at least one RU in an ith 80 MHz other than the 996-tone RU, where i is greater than or equal to 1.

The second indication information is carried in N resource unit allocation subfields corresponding to the at least one RU, where N is greater than or equal to 1.

Manner 3: The first indication information is carried in the ith of four resource unit allocation subfields corresponding to the 996-tone RU, and indicates the 996-tone RU to combine with at least one RU in an ith 80 MHz, where i is greater than or equal to 1.

The second indication information is carried in N resource unit allocation subfields corresponding to the at least one RU, where N is greater than or equal to 1.

Manner 4: The first indication information is carried in the ith of four resource unit allocation subfields corresponding to the 996-tone RU, and indicates the 996-tone RU to combine with a jth 40 MHz in an ith 80 MHz, where i is greater than or equal to 1, and j is greater than or equal to 1.

The second indication information is carried in N resource unit allocation subfields corresponding to the at least one RU, where N is greater than or equal to 1.

According to a fifth aspect, a resource unit combination indication method is provided. The method may be performed by a first communication apparatus. The first communication apparatus may be a communication device or a communication apparatus, for example, a chip system, that can support the communication device to implement a function required in the method. The following uses an example in which the communication device may be a transmit end and the transmit end is an AP for description. The method includes the following steps.

The AP generates a PPDU. The PPDU includes first indication information and second indication information. The first indication information indicates a combination type of a multi-resource unit MRU. The second indication information indicates a quantity of user fields corresponding to the MRU. The MRU is obtained by combining at least two resource units RUs. Any one of the at least two RUs is an RU greater than or equal to a 242-tone RU.

The AP sends the PPDU.

According to a sixth aspect, a resource unit combination indication method is provided. The method may be performed by a second communication apparatus. The second communication apparatus may be a communication device or a communication apparatus, for example, a chip system, that can support the communication device to implement a function required in the method. The following uses an example in which the communication device may be a receive end and the receive end is a STA for description. The method includes the following steps.

The STA receives a PPDU from an AP. The PPDU includes first indication information and second indication information. The first indication information indicates a combination type of a multi-resource unit MRU allocated to P stations STAs. The second indication information indicates a quantity of user fields included in the PPDU. The MRU is obtained by combining at least two resource units RUs. Any one of the at least two RUs is an RU greater than or equal to a 242-tone RU. P is greater than or equal to 0.

The STA determines, based on the first indication information and the second indication information, the MRU to which the STA belongs.

In this solution, the combination type of the MRU, that is, an MRU combination manner, may be defined. The combination type of the MRU is indicated by using the first indication information, and a quantity of P STAs is indicated by using the second indication information. It should be understood that, the first indication information and the second indication information indicate the P STAs to perform transmission on the MRU. According to this solution, combination indication of MRUs of more combination types can be implemented, so that RU allocation is more flexible.

In a possible implementation of the fifth aspect or the sixth aspect, the PPDU includes M resource allocation subfields corresponding to the MRU. M is greater than or equal to 2.

The first indication information is carried in N resource unit allocation subfields of the M resource unit allocation subfields. N is greater than or equal to 1.

For example, the N resource unit allocation subfields are resource unit allocation subfields corresponding to the first 242-tone RU in the first RU in the MRU. In other words, the first indication information is carried in the resource unit allocation subfields corresponding to the first 242-tone RU in the first RU in the MRU.

Alternatively, the N resource unit allocation subfields are resource unit allocation subfields corresponding to the first RU in the MRU. In other words, the first indication information is carried in the resource unit allocation subfields corresponding to the first RU in the MRU.

Alternatively, the N resource unit allocation subfields are resource unit allocation subfields corresponding to a smallest RU in the MRU. In other words, the first indication information is carried in the resource unit allocation subfields corresponding to the smallest RU in the MRU.

Alternatively, the N resource unit allocation subfields are resource unit allocation subfields corresponding to the first 242-tone RU in a smallest RU in the MRU. In other words, the first indication information is carried in the resource unit allocation subfields corresponding to the first 242-tone RU in the smallest RU in the MRU.

In this solution, four manners of carrying the first indication information are described. During specific implementation, one of the four manners of carrying may be selected with consideration of content channel balancing.

In a possible implementation of the fifth aspect or the sixth aspect, the second indication information is carried in M−N resource unit allocation subfields other than the N resource unit allocation subfields in the M resource unit allocation subfields.

In this solution, the second indication information may be carried in the M−N resource unit allocation subfields that do not carry the first indication information, so that content channel balance can be better.

In a possible implementation of the fifth aspect or the sixth aspect, a quantity of user fields corresponding to the N resource unit allocation subfields is 0, and a sum of quantities of user fields corresponding to the M−N resource unit allocation subfields is P.

Alternatively, a quantity of user fields corresponding to the N resource unit allocation subfields is 1, and a sum of quantities of user fields corresponding to the M−N resource unit allocation subfields is P−1.

It should be understood that, if a quantity of user fields corresponding to the N resource unit allocation subfields for carrying the first indication information is 0 or 1, it also indicates one STA to perform transmission on the MRU. Therefore, the solution is applicable to an SU-MIMO transmission scenario.

In a possible implementation of the fifth aspect or the sixth aspect, the second indication information is carried in a first field. The first field includes a U-SIG field and an EHT-SIG common field. The first field occupies K*L bits. K is a quantity of MRUs in a transmission bandwidth. L is an index of respective quantities of users on a CC 1 and a CC 2 in the MRUs. Alternatively, the second indication information is carried in an EHT-SIG common field.

This solution provides an alternative implementation of the second indication information. To be specific, the second indication information may be carried in a field other than the resource allocation subfield, for example, the first field.

In a possible implementation of the fifth aspect or the sixth aspect, the first indication information is carried in a second field. The second field includes a U-SIG field or an EHT-SIG common field. The second indication information is carried in the M resource unit allocation subfields. Each of the M resource unit allocation subfields indicates a corresponding quantity of user fields.

This solution provides an alternative implementation of the first indication information. To be specific, the first indication information may be carried in a field other than the resource allocation subfield, for example, a U-SIG field or an EHT-SIG common field.

According to a seventh aspect, a resource unit combination indication method is provided. The method may be performed by a first communication apparatus. The first communication apparatus may be a communication device or a communication apparatus, for example, a chip system, that can support the communication device to implement a function required in the method. The following uses an example in which the communication device may be a transmit end and the transmit end is an AP for description. The method includes the following steps.

The AP generates a PPDU. The PPDU includes M resource allocation subfields. Each resource allocation subfield indicates a combination type of an MRU to which a corresponding 242-tone RU belongs and a quantity of corresponding user fields. M is a quantity of resource allocation subfields corresponding to the MRU. The MRU is obtained by combining at least two resource units RUs. Any one of the at least two RUs is an RU greater than or equal to a 242-tone RU.

According to an eighth aspect, a resource unit combination indication method is provided. The method may be performed by a second communication apparatus. The second communication apparatus may be a communication device or a communication apparatus, for example, a chip system, that can support the communication device to implement a function required in the method. The following uses an example in which the communication device may be a receive end and the receive end is a STA for description. The method includes the following steps.

The STA receives a PPDU from an AP. The PPDU includes M resource allocation subfields. Each resource allocation subfield indicates a combination type of an MRU to which a corresponding 242-tone RU belongs and a quantity of corresponding user fields. M is a quantity of resource allocation subfields corresponding to the MRU. The MRU is obtained by combining at least two resource units RUs. Any one of the at least two RUs is an RU greater than or equal to a 242-tone RU.

The STA determines, based on the PPDU, the MRU to which the STA belongs.

In this solution, any resource unit allocation subfield corresponding to the MRU may indicate the combination type of the MRU and a quantity of user fields corresponding to the resource unit allocation subfield, so as to indicate one or more STAs to perform transmission on a plurality of contiguous or noncontiguous RUs. A specific combination type may be determined based on a value carried in the resource allocation subfield, so that combination indication of MRUs of more combination types can be implemented, and RU allocation is more flexible.

In a possible implementation of the seventh aspect or the eighth aspect, each of the resource allocation subfields further indicates locations, in a transmission bandwidth, of the at least two RUs included in the MRU.

In this solution, the location, in the transmission bandwidth, of the RU included in the MRU is indicated, so that a quantity of user fields corresponding to the resource allocation subfield can be more flexibly set.

According to a ninth aspect, a communication apparatus is provided. The apparatus includes units configured to perform the steps in the first aspect or any possible implementation of the first aspect, or units configured to perform the steps in the third aspect or any possible implementation of the third aspect, or units configured to perform the steps in the fifth aspect or any possible implementation of the fifth aspect, or units configured to perform the steps in the seventh aspect or any possible implementation of the seventh aspect.

For example, the communication apparatus includes a transceiver unit and a processing unit. The transceiver unit is configured to generate a physical layer protocol data unit PPDU. The PPDU includes a resource unit allocation subfield. The resource unit allocation subfield indicates an MRU to which a 242-tone RU corresponding to the resource unit allocation subfield belongs, and further indicates a quantity of user fields corresponding to the resource unit allocation subfield. The processing unit is used by the AP to send the PPDU. Alternatively, for example, the transceiver unit is configured to receive a physical layer protocol data unit PPDU from an access point AP. The PPDU includes a resource unit allocation subfield. The resource unit allocation subfield indicates an MRU to which a 242-tone RU corresponding to the resource unit allocation subfield belongs, and further indicates a quantity of user fields corresponding to the resource unit allocation subfield. The processing unit is configured to determine the MRU based on the PPDU.

According to a tenth aspect, another communication apparatus is provided. The apparatus includes units configured to perform the steps in the second aspect or any possible implementation of the second aspect, or units configured to perform the steps in the fourth aspect or any possible implementation of the fourth aspect, or units configured to perform the steps in the sixth aspect or any possible implementation of the sixth aspect, or units configured to perform the steps in the eighth aspect or any possible implementation of the eighth aspect.

According to an eleventh aspect, an embodiment of this application provides a communication apparatus. The communication apparatus includes a processor, configured to implement the method performed by the AP in the first aspect or the STA in the second aspect, or configured to implement the method performed by the AP in the third aspect or the STA in the fourth aspect, implement the method performed by the AP in the fifth aspect or the STA in the sixth aspect, or implement the method performed by the AP in the seventh aspect or the STA in the eighth aspect. The communication apparatus may further include a memory, configured to store program instructions and data. The memory is coupled to the processor. The processor may invoke and execute the program instructions stored in the memory, to implement any method performed by the AP in the first aspect or the STA in the second aspect, to implement any method performed by the AP in the third aspect or the STA in the fourth aspect, to implement any method performed by the AP in the fifth aspect or the STA in the sixth aspect, or to implement any method performed by the AP in the seventh aspect or the STA in the eighth aspect. The communication apparatus may further include a communication interface. The communication interface may be a transceiver in the communication apparatus. The transceiver is implemented, for example, by using an antenna, a feeder, and a codec in the communication apparatus. Alternatively, if the communication apparatus is a chip disposed in the STA or AP, the communication interface may be an input/output interface of the chip, for example, an input/output pin. The transceiver is used by the communication apparatus to communicate with another device. For example, when the communication apparatus is a STA, the another device is an AP; or when the communication apparatus is an AP, the another device is a STA.

According to a twelfth aspect, an embodiment of this application provides a chip system. The chip system includes a processor, and may further include a memory, configured to implement the method performed by the AP in the first aspect or the STA in the second aspect, or configured to implement the method performed by the AP in the third aspect or the STA in the fourth aspect, implement the method performed by the AP in the fifth aspect or the STA in the sixth aspect, or implement the method performed by the AP in the seventh aspect or the STA in the eighth aspect. The chip system may include a chip, or may include a chip and another discrete component.

According to a thirteenth aspect, an embodiment of this application provides a communication system. The system includes the AP in the first aspect and the STA in the second aspect, or includes the AP in the third aspect and the STA in the fourth aspect, or includes the AP in the fifth aspect and the STA in the sixth aspect, or includes the AP in the seventh aspect and the STA in the eighth aspect, or includes two communication apparatuses in the ninth aspect, where one communication apparatus is configured to implement a function of the AP, and the other communication apparatus is configured to implement a function of the STA. It should be understood that the communication system may include more APs and/or STAs.

According to a fourteenth aspect, an embodiment of this application further provides a computer-readable storage medium, including instructions. When the instructions are run on a computer, the computer performs the method performed by the AP in the first aspect or the STA in the second aspect, or is configured to implement the method performed by the AP in the third aspect or the STA in the fourth aspect, implement the method performed by the AP in the fifth aspect or the STA in the sixth aspect, or implement the method performed by the AP in the seventh aspect or the STA in the eighth aspect.

According to a fifteenth aspect, an embodiment of this application further provides a computer program product, including instructions. When the instructions are run on a computer, the computer performs the method performed by the AP in the first aspect or the STA in the second aspect, or is configured to implement the method performed by the AP in the third aspect or the STA in the fourth aspect, implement the method performed by the AP in the fifth aspect or the STA in the sixth aspect, or implement the method performed by the AP in the seventh aspect or the STA in the eighth aspect.

For beneficial effects of the ninth aspect to the fifteenth aspect and the implementations of the ninth aspect to the fifteenth aspect, refer to the descriptions of beneficial effects of the methods in the first aspect to the eighth aspect and the implementations of the methods.

BRIEF DESCRIPTION OF DRAWINGS

FIG. 3 is a schematic diagram of a 40 MHz HE-SIG-B frame structure according to an embodiment of this application;

FIG. 18 is a schematic diagram of an example MRU of 320 MHz according to an embodiment of this application;

FIG. 19 is a schematic diagram of a structure of a communication apparatus according to an embodiment of this application; and FIG. 20 is a schematic diagram of a structure of a communication apparatus according to an embodiment of this application.

DESCRIPTION OF EMBODIMENTS

To make objectives, technical solution, and advantages of embodiments of this application clearer, the following further describes embodiments of this application in detail with reference to accompanying drawings.

The embodiments of this application may be applied to a scenario of a wireless local area network (WLAN); and may be applied to an IEEE 802.11 system standard, for example, an IEEE 802.11ax standard, or a next-generation standard or a further next-generation standard. Alternatively, the embodiments of this application may be applied to a wireless local area network system, for example, an Internet of things (IoT) or an Internet of vehicles (Vehicle to X, V2X). Certainly, the embodiments of this application may be further applied to another possible communication system, for example, a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, and a future 5G communications system.

Figure 1:
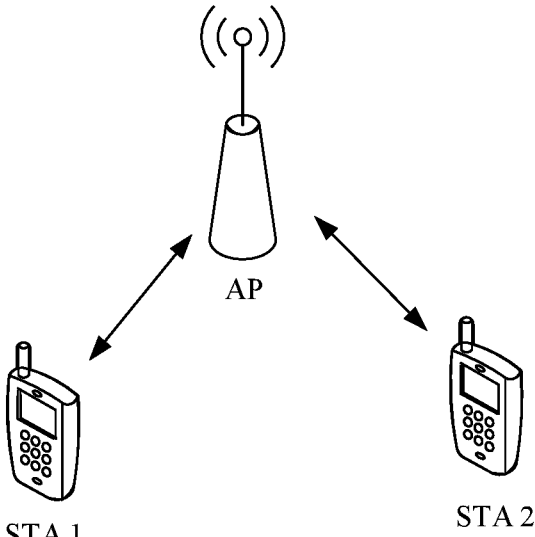
FIG. 1 shows a network architecture of a wireless local area network to which an embodiment of this application is applicable.

For example, FIG. 1 is a diagram of a network architecture of a WLAN to which an embodiment of this application is applicable. FIG. 1 uses an example in which the WLAN includes one AP and a STA 1 and a STA 2 that are associated with the AP. The AP may schedule a radio resource for the STA 1 and the STA 2, and transmit data for the STA 1 and the STA 2 on the scheduled radio resource. The data includes uplink data information and/or downlink data information. It should be understood that a quantity of APs and a quantity of STAs in FIG. 1 are merely an example. There may be more or less APs and STAs. The AP may communicate with the STA 1 or the STA 2, or the AP may communicate with the STA 1 and the STA 2. It should be understood that, if the WLAN includes a plurality of APs and a plurality of STAs, this embodiment of this application is also applicable to communication between APs. For example, the APs may communicate with each other by using a distributed system (DS). Any AP may schedule a radio resource for a STA associated with the AP and/or a STA not associated with the AP, and transmit data for the STA on the scheduled radio resource. This embodiment of this application is also applicable to communication between STAs.

The station STA in this embodiment of this application may be various user terminals, user apparatuses, access apparatuses, subscriber stations, subscriber units, mobile stations, user agents, user equipment, or the like in another name that have a wireless communication function. The user terminal may include various handheld devices, vehicle-mounted devices, wearable devices, computing devices, or other processing devices connected to a wireless modem that have a wireless communication function; and various forms of user equipment (UE), mobile stations (MS), terminals, terminal equipment, portable communication devices, handheld devices, portable computing devices, entertainment devices, game devices or systems, global positioning system devices or any other proper devices configured to perform network communication by using a wireless medium, and the like. Herein, for ease of description, the devices mentioned above are collectively referred to as stations or STAs. The access point AP in this embodiment of this application is an apparatus that is deployed in a wireless communication network and that provides a wireless communication function for the STA associated with the AP. The access point AP may be used as a hub of the communication system. The AP may be a communication device such as a base station, a router, a gateway, a repeater, a communication server, a switch, or a bridge. The base station may include various forms of macro base stations, micro base stations, relay stations, and the like. Herein, for ease of description, the devices mentioned above are collectively referred to as access points APs. Specifically, the AP and the STA in this application may be an AP and a STA to which an IEEE 802.11 system standard is applicable.

The AP communicates with the STA. The AP may allocate a resource to the STA. The STA performs data transmission on the allocated resource. For example, an orthogonal frequency division multiple access (OFDMA) technology or a multi-user multiple-input multiple-output (MU-MIMO) technology may be used for wireless communication between the AP and the STA. In OFDMA and MU-MIMO technologies, a spectrum bandwidth is divided into several resource units (RU) according to a WLAN protocol. For example, bandwidth configurations supported by the 802.11ax protocol include 20 MHz, 40 MHz, 80 MHz, 160 MHz, and 80+80 MHz. A difference between 160 MHz and 80+80 MHz lies in that the former is a contiguous frequency band, and two 80 MHz segments of the latter may be separated. 160 MHz formed by 80+80 MHz is noncontiguous. The IEEE 802.11ax protocol specifies that a spectral bandwidth of 20 MHz, 40 MHz, 80 MHz, or 160 MHz may be divided into a plurality of types of RUs including a 26-tone RU, a 52-tone RU, a 106-tone RU, a 242-tone RU (a largest RU in a 20 MHz bandwidth), a 484-tone RU (a largest RU in a 40 MHz bandwidth), a 996-tone RU (a largest RU in an 80 MHz bandwidth), and a 2*996-tone RU (a largest RU in a 160 MHz bandwidth). Each RU includes contiguous tones. For example, the 26-tone RU is an RU including 26 contiguous tones. In the following, the 26-tone RU is denoted as a 26-tone RU, the 52-tone RU is denoted as a 52-tone RU, and so on.

The AP allocates a resource to the STA in a unit of RU, and may notify, by using a physical layer protocol data unit (PPDU), the STA of the resource allocated to the STA. Specifically, the AP may carry resource allocation information in a signal field (SIG) included in the PPDU, to indicate an allocated RU to the STA. For example, the signal field may be a high efficiency signal field B (HE-SIG-B), or may be an extremely high-throughput signal field (EHT-SIG).

Figure 2:
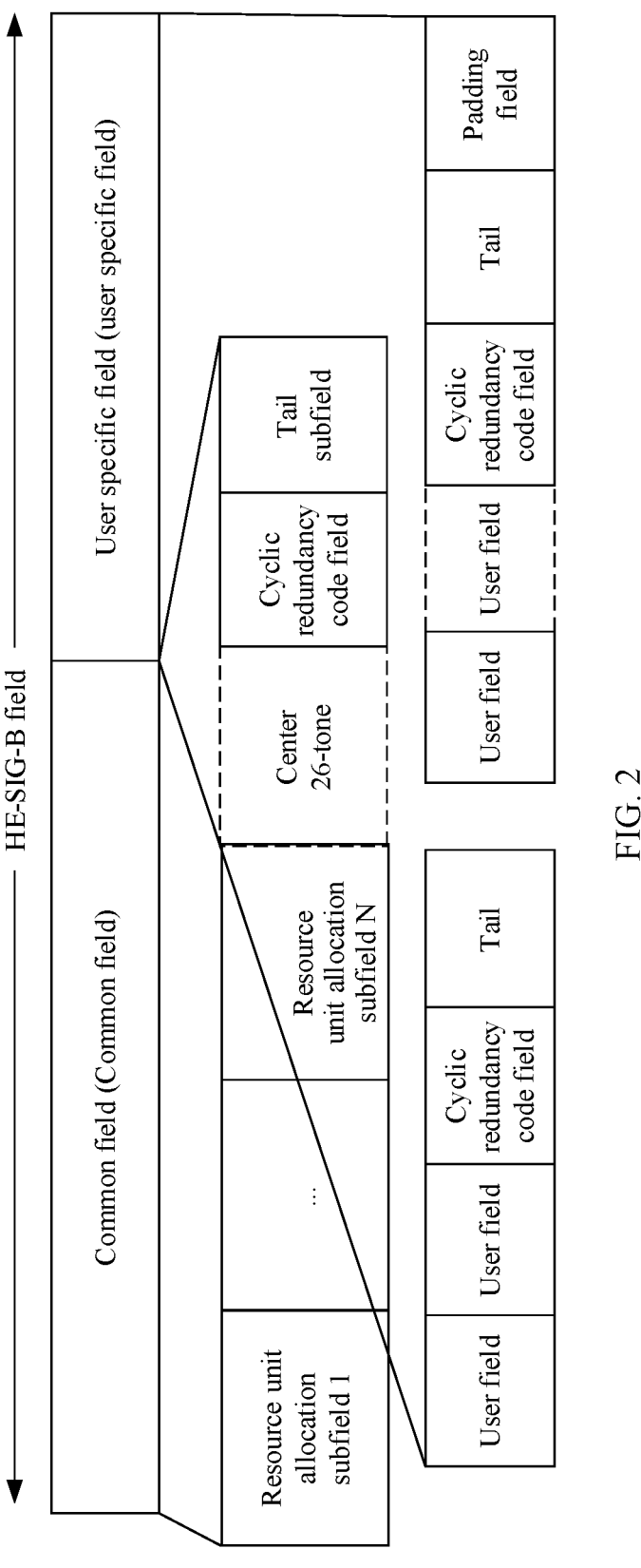
FIG. 2 is a schematic diagram of an HE-SIG-B frame structure according to an embodiment of this application.

FIG. 2 shows an HE-SIG B field format provided in the 802.11ax protocol. The HE-SIG-B is divided into two parts. A first part is a common field, including 1 to N resource unit allocation subfields (RU Allocation subfield), a center 26-tone resource unit indication field for a bandwidth greater than or equal to 80 MHz, a cyclic redundancy code (CRC) used for check, and a tail subfield used for cyclic decoding. In addition, in a user specific field, there are 1 to M user fields in order of resource unit allocation. Herein, generally, every two of the M user fields are in one group, and every two user fields are followed by one CRC and one tail field except a final group. The final group may include one or two user fields, so that one user field in the final group is indicated by using a dashed line. A tail field following the final group of user fields may be followed by a padding field.

One resource unit allocation subfield is one resource unit allocation index, and one resource unit allocation index indicates a size and a location of one or more resource units included in the 20 MHz channel. Order of at least one station field corresponds to order of resource unit allocation. Each station field indicates station information of an allocated STA in an RU included in resource unit allocation.

The resource unit allocation index is indicated by using one or more 8-bit sequences, where every 8 bits correspond to one 20 MHz of a bandwidth spectrum. For example, in the 802.11ax protocol, an index table of resource unit allocation subfields is shown in Table 1. Because the index table indicates an allocated resource, the index table may also be referred to as a resource allocation information table.

TABLE 1

| Resource unit allocation subfield (B7, B6, B5, B4, B3, B2, B1, B0) | #1 | #2 | #3 | #4 | #5 | #6 | #7 | #8 | #9 | Quantity |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 |  | 1 |
| 00000010 | 26 | 26 | 26 | 26 | 26 | 52 |  | 26 | 26 | 1 |
| 00000011 | 26 | 26 | 26 | 26 | 26 | 52 |  | 52 |  | 1 |
| 00000100 | 26 | 26 | 52 |  | 26 | 26 | 26 | 26 | 26 | 1 |
| 00000101 | 26 | 26 | 52 |  | 26 | 26 | 26 | 52 |  | 1 |
| 00000110 | 26 | 26 | 52 |  | 26 | 52 |  | 26 | 26 | 1 |
| 00000111 | 26 | 26 | 52 |  | 26 | 52 |  | 52 |  | 1 |
| 00001000 | 52 |  | 26 | 26 | 26 | 26 | 26 | 26 | 26 | 1 |
| 00001001 | 52 |  | 26 | 26 | 26 | 26 | 26 | 52 |  | 1 |
| 00001010 | 52 |  | 26 | 26 | 26 | 52 |  | 26 | 26 | 1 |
| 00001011 | 52 |  | 26 | 26 | 26 | 52 |  | 52 |  | 1 |
| 00001100 | 52 |  | 52 |  | 26 | 26 | 26 | 26 | 26 | 1 |
| 00001101 | 52 |  | 52 |  | 26 | 26 | 26 | 52 |  | 1 |
| 00001110 | 52 |  | 52 |  | 26 | 52 |  | 26 | 26 | 1 |
| 00001111 | 52 |  | 52 |  | 26 | 52 |  | 52 |  | 1 |
| 00010y2y1y0 | 52 |  | 52 |  | — |  | 106 |  |  | 8 |
| 00011y2y1y0 |  | 106 |  |  | — | 52 |  | 52 |  | 8 |
| 00100y2y1y0 | 26 | 26 | 26 | 26 | 26 |  | 106 |  |  | 8 |
| 00101y2y1y0 | 26 | 26 | 52 |  | 26 |  | 106 |  |  | 8 |
| 00110y2y1y0 | 52 |  | 26 | 26 | 26 |  | 106 |  |  | 8 |
| 00111y2y1y0 | 52 |  | 52 |  | 26 |  | 106 |  |  | 8 |
| 01000y2y1y0 |  | 106 |  |  | 26 | 26 | 26 | 26 | 26 | 8 |
| 01001y2y1y0 |  | 106 |  |  | 26 | 26 | 26 | 52 |  | 8 |
| 01010y2y1y0 |  | 106 |  |  | 26 | 52 |  | 26 | 26 | 8 |
| 01011y2y1y0 |  | 106 |  |  | 26 | 52 |  | 52 |  | 8 |
| 0110y1y0z1z0 |  | 106 |  |  | — |  | 106 |  |  | 16 |
| 01110000 | 52 |  | 52 |  | — | 52 |  | 52 |  | 1 |
| 01110001 | 242-tone RU null (zero stations)-denoted as 242 (0) |  |  |  |  |  |  |  |  | 1 |
| 01110010 | A resource unit allocation subfield of an HE-SIG-B content channel includes a 484-tone RU with 0 user field, which is denoted as 484 (0). |  |  |  |  |  |  |  |  | 1 |

TABLE 1-continued

| Resource unit allocation subfield (B7, B6, B5, B4, B3, B2, B1, B0) | #1 | #2 | #3 | #4 | #5 | #6 | #7 | #8 | #9 | Quantity |
|---|---|---|---|---|---|---|---|---|---|---|
| 01110011 | | | | A resource unit allocation subfield of an HE-SIG-B content channel includes a 996-tone RU with 0 user field, which is denoted as 996 (0). | | | | | | 1 |
| 011101x1x0 | | | | | Reserved | | | | | 4 |
| 01111y2y1y0 | | | | | Reserved | | | | | 8 |
| 10y2y1y0z2z1z0 | | 106 | | | 26 | | 106 | | | 64 |
| 11000y2y1y0 | | | | 242, denoted as 242 (n), n = 1 to 8 | | | | | | 8 |
| 11001y2y1y0 | | | | 484, denoted as 484 (n), n = 1 to 8 | | | | | | 8 |
| 11010y2y1y0 | | | | 996, denoted as 996 (n), n = 1 to 8 | | | | | | 8 |
| 11011y2y1y0 | | | | | Reserved | | | | | 8 |
| 111x4x3x2x1x0 | | | | | Reserved | | | | | 32 |

In Table 1, the first column indicates the 8-bit sequence, and middle columns #1 to #9 indicate different resource units. A number in a cell indicates a quantity of subcarriers included in the resource unit. For example, a sequence "00111y2y1y0" indicates that an entire 242-tone RU is divided into four RUs: a 52-tone RU, a 52-tone RU, a 26-tone RU, and a 106-tone RU. A quantity in the third column indicates a quantity of entries for a same resource unit allocation, in other words, a quantity of different sequences corresponding to a same resource unit arrangement manner. For the index "00111y2y1y0", a resource unit allocation manner of the 242-tone RU is indicated, and meanwhile y2y1y0 further indicates a quantity, included in the 106-tone RU, of users in SU/MU-MIMO transmission. There may be one to eight users, so that there are eight entries. In other words, 3-bit y2y1y0 indicates one to eight users supported in the 106-tone RU. The eight entries may be considered as eight independent rows in a table. The eight rows correspond to a same resource unit allocation manner, and each row corresponds to a different quantity of users supported by the 106-tone RU. When resource unit arrangement and combination indicated in one resource unit allocation subfield includes a resource unit including at least 106 subcarriers, the resource unit allocation index further indicates a quantity of MU-MIMO users that is supported by the resource unit including at least 106 subcarriers.

A concept of a content channel (CC) is further introduced in the 802.11ax protocol. When a bandwidth is only 20 MHz, the HE-SIG-B includes only one CC. The CC includes one resource unit allocation subfield that indicates an allocated RU within 20 MHz. The resource unit allocation subfield occupies 8 bits that may indicate all possible RU arrangement and combination manners for the 20 MHz bandwidth by using indexes. For an RU whose size is greater than or equal to a 106-tone RU, a quantity of users in SU/MU-MIMO transmission or a quantity of user information fields, for example, the letter x or y in Table 1 further needs to be indicated in the RU. For details, refer to the 802.11ax protocol.

If a transmission bandwidth is greater than 20 MHz, repeated legacy signal (RL-SIG) and an HE-SIG-A field in a legacy preamble (legL-preamble) and a high efficiency preamble (HE-preamble) included in the PPDU are duplicated and transmitted every 20 MHz. For the HE-SIG B, a "1212" transmission method is used: The HE-SIG B includes two CCs, one CC including resource allocation information of a plurality of odd-numbered 20 MHz bandwidths in the transmission bandwidth and station information transmitted on the plurality of odd-numbered 20 MHz bandwidths is transmitted on each of the plurality of odd-numbered 20 MHz bandwidths, and the other CC including resource allocation information of a plurality of even-numbered 20 MHz bandwidths in the transmission bandwidth and station information transmitted on the plurality of even-numbered 20 MHz bandwidths is transmitted on each even-numbered 20 MHz bandwidth. It should be understood that content of the resource unit allocation subfield is partially displayed in each of the two CCs. Through reading the two CCs, the STA may learn of RUs obtained by dividing a spectral bandwidth resource.

For example, refer to FIG. 3. FIG. 3 is a structure of an HE-SIG-B for 40 MHz. When the bandwidth is 40 MHz, there are two CCs: a CC 1 and a CC 2. The CC 1 includes a resource unit allocation subfield in a range of an odd-numbered 20 MHz (the first 20 MHz bandwidth) bandwidth and a user specific field corresponding to the resource unit allocation subfield, and the CC 2 includes a resource unit allocation subfield in a range of an even-numbered 20 MHz (the second 20 MHz) bandwidth and a user specific field corresponding to the resource unit allocation subfield.

For another example, when a bandwidth is 80 MHz, there are also two CCs: a CC 1 and a CC 2. The CC 1 includes resource unit allocation subfields in a range including odd-numbered 242-tone RUs (namely, the first 20 MHz bandwidth and the third 20 MHz bandwidth) and corresponding user specific fields. The CC 2 includes resource unit allocation subfields in a range including even-numbered 242-tone RUs (namely, the second 20 MHz bandwidth and fourth 20 MHz bandwidth) and corresponding user specific fields.

Although a plurality of RU allocation modes are configured by using the resource unit allocation subfield shown in Table 1, only one RU can be allocated to one or more users, and a plurality of contiguous or noncontiguous RUs cannot be allocated to one or more users. For example, there are three RUs: an RU 1, an RU 2, and an RU 3. Channel conditions of the RU 1 and the RU 3 are better than a channel condition of the RU 2. In an ideal case, the RU 1 and the RU 3 may be allocated to a same user. However, at present, allocating only one of the RU 1 and the RU 3 to a same user is supported, but allocating both the RU 1 and the RU 3 to a same user is not yet supported. It can be learned that RU allocation flexibility is low, and spectrum utilization is also low.

In the future, a plurality of contiguous or noncontiguous RUs may be allocated to one or more users, to improve RU allocation flexibility and/or frequency utilization. In this specification, a plurality of contiguous or noncontiguous RUs are referred to as a multi-RU. It should be understood that a multi-RU are RUs including a plurality of RUs. In some embodiments, a multi-RU may be denoted as a multi-RU, or may be denoted as an MRU. It should be noted that, in this specification, the multi-RU is uniformly denoted as an MRU.

The 802.11ax protocol supports allocation of a maximum of 160 MHz, and may support a larger bandwidth in the future, for example, 240 MHz and 320 MHz. Currently, the 802.11ax protocol does not specify all possible RU arrangement and combination manners within 320 MHz, namely, a multi-RU combination manner. For example, currently, MRUs are classified into a small RU type and a large RU type. The small RU type means that a plurality of RUs included in an MRU are RUs smaller than a 242-tone RU. For example, a set of RUs included in the MRU is {26, 52, 106}. It should be understood that numbers (26, 52, 106) in the set respectively indicate a 26-tone RU, a 52-tone RU, and a 106-tone RU. Relatively, the large RU type means that a plurality of RUs included in an MRU are all RUs greater than or equal to a 242-tone RU. For example, if a set of RUs included in an MRU is {242, 484, 2*996}, it indicates that the MRU includes a combination of a 242-tone RU, a 484-tone RU, and two 996-tone RUs. It should be understood that the combination type herein may also be considered as a combination manner or a combining manner. In this specification, combination manners or group manners of a plurality of RUs are collectively referred to as the combination type.

For example, in OFDMA transmission with an 80 MHz bandwidth, a supported MRU combination type is shown in Table 2.

TABLE 2

| RU size | Equivalent bandwidth | Quantity of combinations |
|---|---|---|
| 484 + 242 | 60 MHz | 4 |

It should be understood that there are four different cases of locations of a 242-tone RU and a 484-tone RU in the 80 MHz bandwidth. Therefore, a quantity of combinations in Table 2 is 4.

In OFDMA transmission with a 160 MHz bandwidth, a supported MRU combination type is shown in Table 3.

TABLE 3

| RU size | Equivalent bandwidth | Quantity of combinations |
|---|---|---|
| 484 + 996 | 120 MHz | 4 |

In OFDMA transmission with a 240 MHz bandwidth, if 240 MHz is contiguous 240 MHz on a spectrum, a plurality of RUs included in an MRU corresponding to one STA are allowed to exist only in 160 MHz formed by two contiguous 80 MHz. In other words, an RU combination in which the plurality of RUs are separately located in three 80 MHz bandwidths is not allowed. If 240 MHz consists of two noncontiguous parts, namely, 160 MHz+80 MHz, large RUs are allowed to be combined in only the contiguous 160 MHz part or the other contiguous 80 MHz part.

In OFDMA transmission with a bandwidth of 320 MHz or 160 MHz+160 MHz, a plurality of RUs included in an MRU corresponding to one STA are allowed to be in only primary 160 MHz or only secondary 160 MHz.

In non-OFDMA transmission (for example, single-user transmission or MU-MIMO transmission), a plurality of RUs may also be combined. It should be understood that for non-OFDMA transmission, after preamble puncturing is performed, a remaining part that is not punctured forms an MRU. Therefore, an MRU combination type supported in non-OFDMA transmission is equivalent to a preamble puncturing combination supported in non-OFDMA transmission.

For example, in non-OFDMA transmission with an 80 MHz bandwidth, a supported combination of a plurality of RUs is as shown in Table 4.

TABLE 4

| RU size | Equivalent bandwidth | Quantity of combinations |
|---|---|---|
| 484 + 242 | 60 MHz | 4 |

In non-OFDMA transmission with a 160 MHz bandwidth, a supported combination of a plurality of RUs is as shown in Table 5.

TABLE 5

| RU size in 80 MHz | RU size in 80 MHz | Equivalent bandwidth | Quantity of combinations |
|---|---|---|---|
| 484 | 996 | 120 MHz | 4 |
| 484 + 242 | 996 | 140 MHz | 8 |

In non-OFDMA transmission with a 240 MHz bandwidth, a supported combination of a plurality of RUs is as shown in Table 6.

TABLE 6

| RU size in 80 MHz | RU size in 80 MHz | RU size in 80 MHz | Equivalent bandwidth | Quantity of combinations |
|---|---|---|---|---|
| 484 | 996 | 996 | 200 MHz | 6 |
| — | 996 | 996 | 160 MHz | 3 |

In non-OFDMA transmission with a 320 MHz bandwidth, a supported combination of a plurality of RUs is as shown in Table 7.

TABLE 7

| RU size in 80 MHz | RU size in 80 MHz | RU size in 80 MHz | RU size in 80 MHz | Equivalent bandwidth | Quantity of combinations |
|---|---|---|---|---|---|
| 484 | 996 | 996 | 996 | 280 MHz | 8 |
| — | 996 | 996 | 996 | 240 MHz | 4 |

Table 2 to Table 7 show currently supported MRU combination types. Apparently, not all possible RU arrangement and combination manners are described. It should be understood that, if all possible arrangement and combination manners of RUs are provided, although RU combination is more flexible, complexity also increases accordingly. Therefore, in a possible implementation, the following RU combination rules may be set in embodiments of this application, to consider both flexibility and complexity of RUs:

1: A small RU and a large RU are not combined;

2: small RUs are not combined across 20 MHz; and

3: a combination of small RUs should be contiguous, and optionally, may alternatively be noncontiguous.

According to the foregoing rules, embodiments of this application show possible MRU combination types in 80 MHz to 320 MHz. For example, Table 8 shows some MRU possible combination types.

TABLE 8

| MRU combination type | Equivalent bandwidth | Transmission bandwidth |
|---|---|---|
| 242 + 242 | 40 MHz | 80 MHz |
| 242 + 484 | 60 MHz | |
| 242 + 242 + 996 | 120 MHz | 160 MHz |
| 484 + 996 | 120 MHz | |
| 242 + 484 + 242 + 484 | 120 MHz | |
| 242 + 484 + 996 | 140 MHz | |
| 996 + 996 | 160 MHz | 240 MHz |
| 484 + 996 + 996 | 200 MHz | |
| 242 + 484 + 996 + 996 | 220 MHz | |
| 996 + 996 + 996 | 240 MHz | 320 MHz |
| 484 + 996 + 996 + 996 | 280 MHz | |
| . . . | . . . | . . . |

In Table 8, the first column indicates an MRU combination type, and a number in the cell indicate a size of each RU included in an MRU. For example, 242+242+996 indicates that the MRU consists of three RUs: a 242-tone RU, a 242-tone RU, and a 996-tone RU. The middle column indicates an equivalent bandwidth of the MRU, and the third column indicates a transmission bandwidth that the MRU belongs. For example, in a transmission bandwidth of 160 MHz, an MRU combination type may be "242+242+996", or may be "242+484+996".

Table 2 to Table 7 provide only some MRU combination types, and do not provide an MRU allocation indication solution. This application provides a resource unit combination indication method, to notify one or more users of a combination type of a plurality of contiguous or noncontiguous RUs, so that the one or more users can use the plurality of contiguous or noncontiguous RUs to perform MU-MIMO data transmission. In addition, more MRU combination types are supported, thereby improving RU allocation flexibility of a system and spectrum utilization of the system.

When the AP indicates each STA to send data, the AP needs to notify each STA of an RU allocated by the AP to each STA. Specifically, in embodiments of this application, the resource allocation information table may be constructed. The resource allocation information table is similar to the resource allocation information table in the 802.11ax standard. For example, the resource allocation information table may be a table constructed by using a bit sequence in the resource allocation information table in the 802.11ax standard. The bit sequence in the resource allocation information table may indicate that one STA or more STAs are allocated to one MRU for data transmission. It should be understood that an available bit sequence in the resource allocation information table constructed in embodiments of this application may be the bit sequence defined in Table 1, or may be an undefined bit sequence, that is, a reserved bit sequence in Table 1, for example, "011101x1×0", "01111y2y1y0", "11011y2y1y0", or "111x4x3x2x1x0".

With reference to the accompanying drawings, the following describes several resource unit combination indication solutions provided in embodiments of this application. It should be noted that a bit sequence in embodiments of this application is an m-bit sequence. m is greater than or equal to 8. In embodiments of this application, a maximum quantity of users or user fields that support MU-MIMO transmission on an MRU is 16. In the following description, an example in which m is equal to 8 and a maximum quantity of users or user fields is 8 is used. In this specification, for example, "242-tone RU+242-tone RU" may also be denoted as "242+242". "242-tone RU+242-tone RU" is equivalent to "242+242", and similarly, "484-tone RU+996-tone RU" is equivalent to "484+996".

Solution 1: An m-bit sequence in a resource allocation information table indicates an MRU combination type, and another m-bit sequence in the resource allocation table indicates a quantity of user fields corresponding to a resource allocation subfield corresponding to the m-bit sequence. For example, when the transmission bandwidth is 80 MHz, four m-bit sequences indicate that one STA or more STAs are allocated to one MRU for transmission. One of the four m-bit sequences may indicate an MRU combination type, and a portion of m-bit sequences of the remaining three m-bit sequences indicate respective quantities of user fields corresponding to the m-bit sequence. It should be understood that a sum of quantities of user fields corresponding to the portion of m-bit sequences is the quantity of one STA or the more STAs.

In other words, an entry for indicating an MRU combination type and an entry for indicating a quantity of user fields may be added to Table 1. The AP may indicate, by using the entry for indicating the MRU combination type and the entry for indicating the quantity of user fields, the one STA or more STAs to perform SU-MIMO transmission or MU-MIMO data transmission on the MRU.

For example, Table 9 shows possible entries for indicating an MRU combination type in a resource allocation information table provided in embodiments of this application. It should be understood that bit sequences in Table 9 are examples of the reserved bit sequence in Table 1.

TABLE 9

| Index of a new entry of a resource unit allocation subfield (B7-B0) | Description (indicating an MRU combination type) | Quantity of entries |
|---|---|---|
| 11110000 | 242 + 242, combination into an MRU within 80 MHz, where there is 0 user field in a user-specific field | 1 |
| 11110001 | 242 + 484, combination into an MRU within 80 MHz, where there is 0 user field in a user-specific field | 1 |
| 11110010 | 242 + 242 + 996, combination into an MRU within 160 MHz, where there is 0 user field in a user-specific field | 1 |
| 11110011 | 484 + 996, combination into an MRU within 160 MHz, where there is 0 user field in a user-specific field | 1 |
| 11110100 | 242 + 484 + 242 + 484, combination into an MRU within 160 MHz, where there is 0 user field in a user-specific field | 1 |
| 11110101 | 242 + 484 + 996, combination into an MRU within 160 MHz, where there is 0 user field in a user-specific field | 1 |
| 11110110 | 996 + 996, combination into an MRU within 240 MHz, where there is 0 user field in a user-specific field | 1 |
| 11110111 | 484 + 996 + 996, combination into an MRU within 240 MHz, where there is 0 user field in a user-specific field | 1 |
| 11111000 | 242 + 484 + 996 + 996, combination into an MRU within 240 MHz, where there is 0 user field in a user-specific field | 1 |
| 11111001 | 996 + 996 + 996, combination into an MRU within 320 MHz, where there is 0 user field in a user-specific field | 1 |
| 11111010 | 484 + 996 + 996 + 996, combination into an MRU within 320 MHz, where there is 0 user field in a user-specific field | 1 |
| . . . | . . . | . . . |

In Table 9, the first column indicates an 8-bit sequence. The middle column indicates an MRU combination type, in other words, a combination manner of a plurality of RUs included in the MRU. A number in the cell indicates a size of each RU of a plurality of RUs included in the MRU in a transmission bandwidth. For example, an index "11111000" indicates that an MRU in a transmission bandwidth of 240 MHz is obtained by combining a 242-tone RU, a 484-tone RU, a 996-tone RU, and a 996-tone RU. A quantity of entries in the third column indicates a quantity of entries for a same resource unit allocation, in other words, a quantity of different indexes corresponding to a same resource unit arrangement manner. It should be understood that an 8-bit sequence in Table 9 indicates an MRU combination type. Different 8-bit sequences indicate different MRU combination types. Therefore, each resource unit arrangement manner corresponds to one entry.

For example, Table 10 shows possible entries for indicating a quantity of user fields in a resource allocation information table provided in embodiments of this application. The possible entries for indicating a quantity of user fields in the resource allocation information table may be considered to be possible entries for indicating a quantity of users. It should be understood that bit sequences in Table 10 are examples of the reserved bit sequence in Table 1.

TABLE 10

| Index of a new entry of a resource unit allocation subfield (B7-B0) | Description (indicating a quantity of user fields) | Quantity of entries |
|---|---|---|
| 11100000 | A corresponding 242-tone RU belongs to one MRU, and the resource unit allocation subfield corresponds to 0 user field. | 1 |
| 11100001 | A corresponding 242-tone RU belongs to one MRU, and the resource unit allocation subfield corresponds to 1 user field. | 1 |
| 11100010 | A corresponding 242-tone RU belongs to one MRU, and the resource unit allocation subfield corresponds to 2 user fields. | 1 |
| 11100011 | A corresponding 242-tone RU belongs to one MRU, and the resource unit allocation subfield corresponds to 3 user fields. | 1 |
| 11100100 | A corresponding 242-tone RU belongs to one MRU, and the resource unit allocation subfield corresponds to 4 user fields. | 1 |
| 11100101 | A corresponding 242-tone RU belongs to one MRU, and the resource unit allocation subfield corresponds to 5 user fields. | 1 |
| 11100110 | A corresponding 242-tone RU belongs to one MRU, and the resource unit allocation subfield corresponds to 6 user fields. | 1 |
| 11100111 | A corresponding 242-tone RU belongs to one MRU, and the resource unit allocation subfield corresponds to 7 user fields. | 1 |
| 11101000 | A corresponding 242-tone RU belongs to one MRU, and the resource unit allocation | 1 |

TABLE 10-continued

| Index of a new entry of a resource unit allocation subfield (B7-B0) | Description (indicating a quantity of user fields) | Quantity of entries |
|---|---|---|
| | subfield corresponds to 8 user fields. | |
| . . . | . . . | . . . |

In Table 10, the first column indicates an 8-bit sequence. A middle column indicates that a 242-tone RU corresponding to the 8-bit sequence belongs to one MRU, and indicates a quantity of user fields corresponding to the 8-bit sequence. For example, a sequence "11100111" indicates that a 242-tone RU corresponding to "11100111" is an RU in one MRU, and a quantity of user fields corresponding to "11100111" is 7. A quantity of entries in the third column indicates a quantity of entries for a same resource unit allocation, in other words, a quantity of different indexes corresponding to a same resource unit arrangement manner. It should be understood that an 8-bit sequence in Table 10 indicates that a corresponding 242-tone RU belongs to one MRU and a quantity of corresponding user fields. Different 8-bit sequences indicate different quantities of corresponding user fields. Therefore, each resource unit arrangement manner corresponds to one entry.

It should be understood that Table 9 and Table 10 are shown by using the reserved bit sequence in Table 1. In embodiments of this application, the STA may be notified of a resource unit combination indication by using the examples of 8-bit sequences in Table 9 and Table 10. The foregoing Table 9 and Table 10 indicate that M 8-bit sequences indicate an MRU obtained by division in the transmission bandwidth, and one or more users perform MU-MIMO transmission on the MRU. M depends on the transmission bandwidth. For example, M may be equal to the transmission bandwidth/20 MHz. It should be understood that the transmission bandwidth is a multiple of 20 MHz. For example, the transmission bandwidth is 80 MHz, and M is equal to 4; or the transmission bandwidth is 160 MHz, and M is equal to 8. It should be further understood that, the middle column in Table 9 may also indicate a quantity of corresponding user fields in addition to an MRU combination type. Because a quantity of users on the MRU can be indicated in Table 10, it may be understood that the middle column in Table 9 indicates the MRU combination type, and indicate a quantity of corresponding user fields, which is 0 by default. Certainly, in some embodiments, the middle column in Table 9 may also indicate an MRU combination type and a quantity of user fields, where the quantity is 1, 2, or the like by default. This is not limited in this embodiment of this application.

Specifically, in embodiments of this application, the 8-bit sequence in Table 9 and the 8-bit sequence in Table 10 may be carried in a signal field. In other words, the user is notified of the MRU combination type and user information corresponding to the MRU by using the signal field. For example, the signal field may be a signal field B, or may be an extremely high throughput signal field (EHT SIG), or may be a signal field included in an EHT SIG, or may be an EHT SIG-B, or may be another field included in a physical layer protocol data unit (PPDU). This is not limited herein in this embodiment of this application.

With reference to the accompanying drawings, the following describes, by using a possible structure of a PPDU as an example, a resource unit combination indication method implemented based on Table 9 and Table 10.

Figure 4:
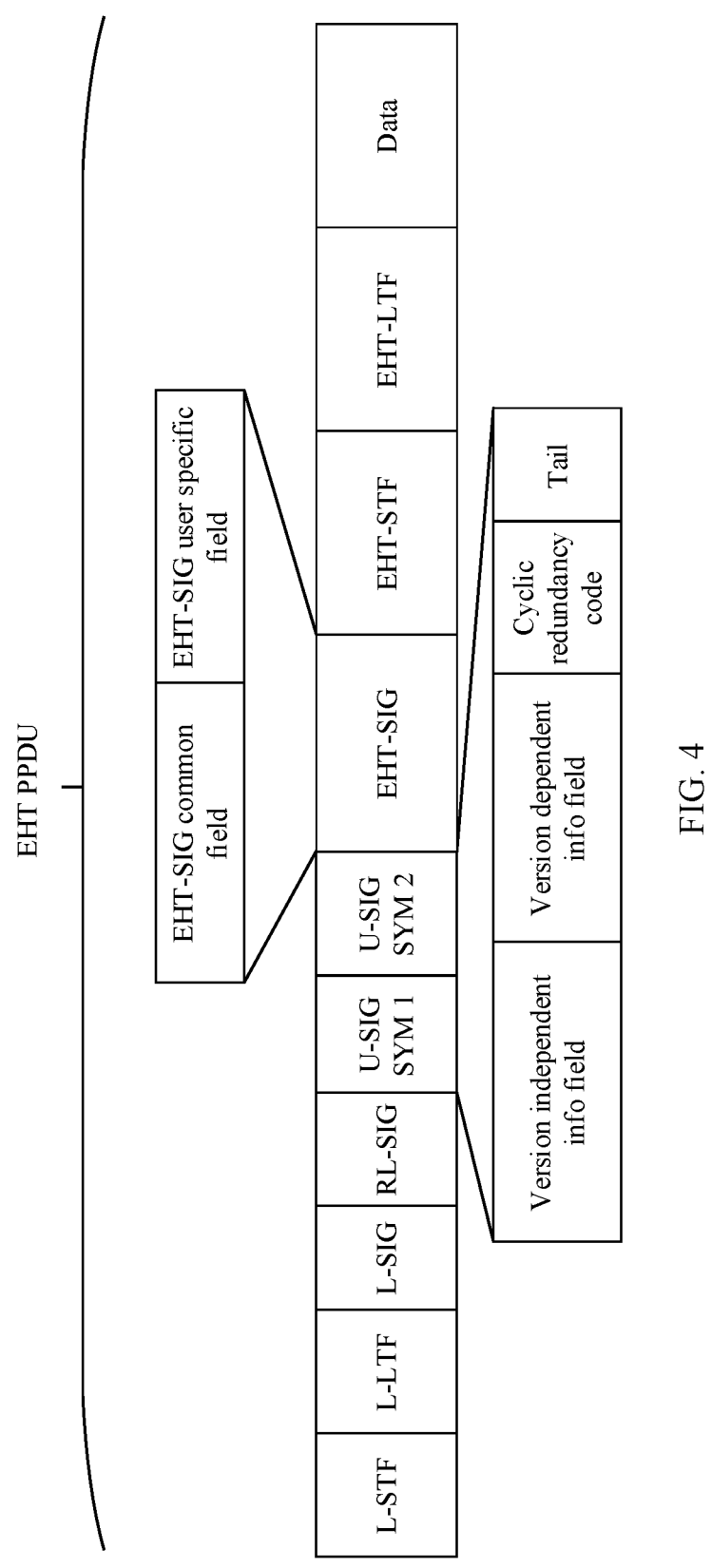
FIG. 4 is a schematic diagram of a frame structure of an HE MU PPDU according to an embodiment of this application.

The PPDU in embodiments of this application may be an EHT PPDU. FIG. 4 is an example of a frame structure of the EHT PPDU. As shown in FIG. 4, the EHT PPDU may include an L-STF field, an L-LTF field, an L-SIG field, an RL-SIG field, a universal field (U-SIG, Universal SIG) field, an extremely high throughput signal field (EHT-SIG field), an extremely high throughput short training field (EHT-STF field), an extremely high throughput long training field (EHT-LTF) or a data field, where the U-SIG field occupies two OFDM symbols, a U-SIG SYM 1 and a U-SIG SYM 2 shown in FIG. 8. The universal field (U-SIG) field may include a version independent info field and a version dependent info field. The version independent info field may include a 3-bit Wi-Fi version field, a 1-bit downlink/uplink field, a BSS color field with at least 6 bits, a TxOP field with at least 7 bits, a CRC field with at least 4 bits, and a 6-bit tail bit field. Further, the version independent info field may further include a bandwidth field. The version dependent info field may include a PPDU format field or the like, and may further include one or more of a modulation and coding scheme field, a spatial flow field, an encoding field, and the like.

Figure 5:
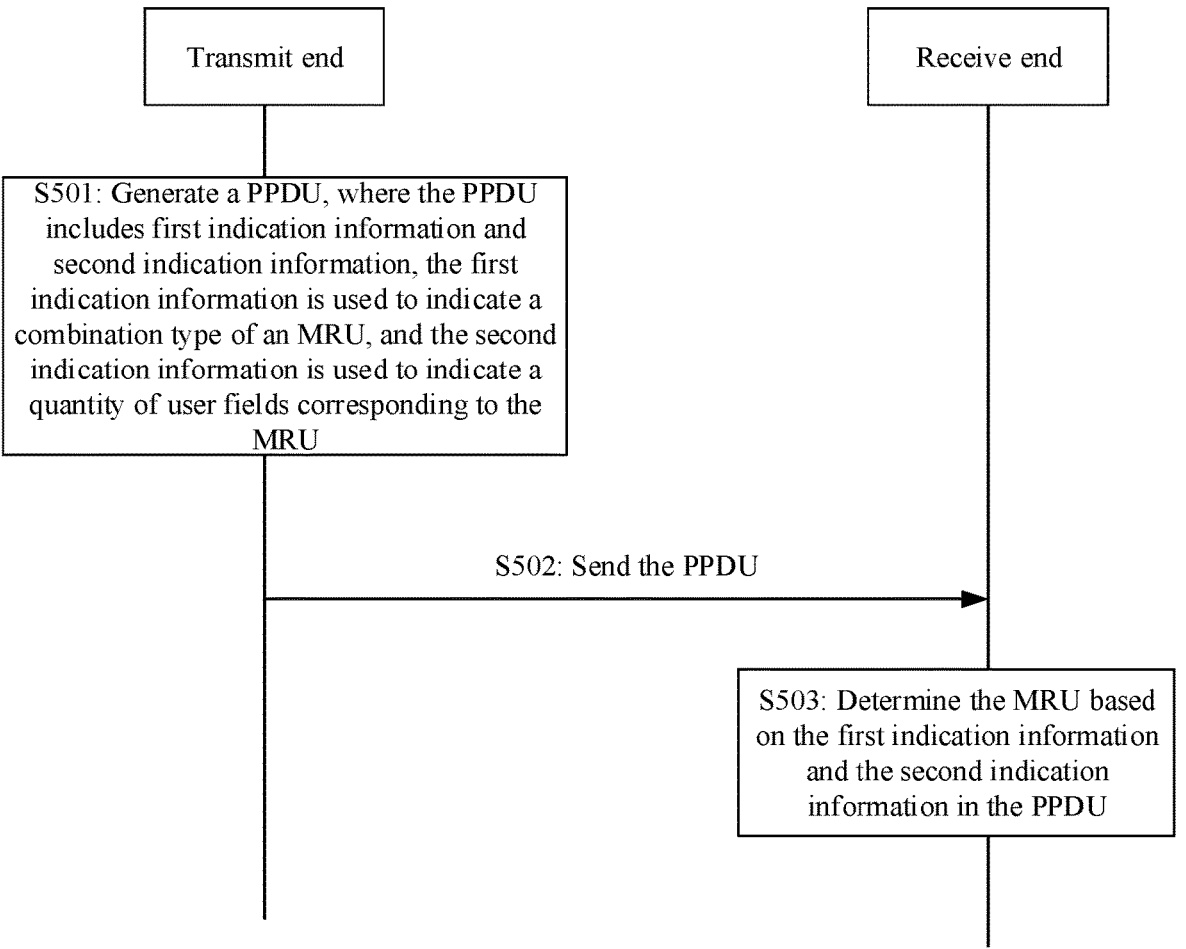
FIG. 5 is a schematic diagram of an example of a resource unit combination indication method according to an embodiment of this application.

FIG. 5 is a schematic flowchart of a resource unit combination indication method according to an embodiment of this application. The method may be applied to the scenario shown in FIG. 1. Certainly, the method may also be applied to another possible communication scenario or communication system. This is not limited in embodiments of this application. It should be understood that the method relates to a transmitting device and a receiving device. In the description of this specification, the transmitting device is also referred to as a transmit end, and the receiving device is also referred to as a receive end. In the following description, an example in which the transmit end is an AP and the receive end is a STA is used. The method includes the following steps.

S501: The transmit end generates a PPDU. The PPDU includes first indication information and second indication information. The first indication information indicates a combination type of an MRU. The second indication information indicates a quantity of user fields corresponding to the MRU.

S502: The transmit end sends the PPDU, and the receive end receives the PPDU.

S503: The receive end determines the MRU based on the first indication information and the second indication information in the PPDU.

It should be understood that, after determining the MRU, the STA may perform SU-MIMO transmission on the MRU, may perform MU-MIMO transmission on the MRU, may perform OFDMA transmission on the MRU, or the like. This is not limited in embodiments of this application. It should be noted that, the following uses an example in which the STA performs MU-MIMO transmission on the MRU after determining the MRU.

It should be understood that, the first indication information uses the entry in Table 9. In other words, the first indication information is 8-bit sequence information in Table 9 that indicates an MRU combination type. The second indication information uses the entry in Table 10. In other words, the second indication information includes at least one piece of 8-bit sequence information in Table 10 that indicates a quantity of user fields corresponding to one 242-tone RU. It should be understood that the quantity of user fields may be the same as a quantity of users. When the quantity of user fields is the same as the quantity of users, the second indication information may indicate the quantity of users by using the entry in Table 10.

In a possible implementation, both the first indication information and the second indication information may be carried in a resource allocation subfield included in the PPDU. In other words, the first indication information used to indicate the MRU combination type may be carried in the resource allocation subfield included in the PPDU, and the second indication information used to indicate the quantity of user fields corresponding to the MRU may also be carried in the resource allocation subfield included in the PPDU. It should be understood that the PPDU includes an EHT-SIG common field and at least one user information field, and the EHT-SIG common field includes M resource allocation subfields. Because the MRU in this embodiment of this application belongs to at least 80 MHz, M is greater than or equal to 4. The at least one user information field may carry specific user information, for example, a STA ID.

In some embodiments, the first indication information may carry at least one resource allocation subfield corresponding to an RU in the MRU, may carry a resource allocation subfield corresponding to a smallest RU of RUs in the MRU, or the like. Several implementations of the first indication information and the second indication information are described below. It should be noted that, in the following description, a plurality of RUs included in the MRU appear in ascending order of frequencies. For example, an RU that first appears in the plurality of RUs included in the MRU is an RU that first appears in the ascending order of frequencies. Certainly, the order is not limited in embodiments of this application, and may be descending order of frequencies. In this embodiment of this application, an example in which the order is the ascending order of frequencies is used.

In a first example, the first indication information is carried in a resource allocation subfield corresponding to the first 242-tone RU in an RU that first appears in the plurality of RUs included in the MRU, and a resource allocation subfield in the MRU other than the resource allocation subfield corresponding to the first 242-tone RU carries the second indication information. In other words, the resource allocation subfield corresponding to the first 242-tone RU in the RU that first appears in the plurality of RUs included in the MRU uses the entry in Table 9. Resource allocation subfields corresponding to all remaining 242-tone RUs in the MRU other than the first 242-tone RU in the RU that first appears use the entry shown in Table 10.

Figure 6:
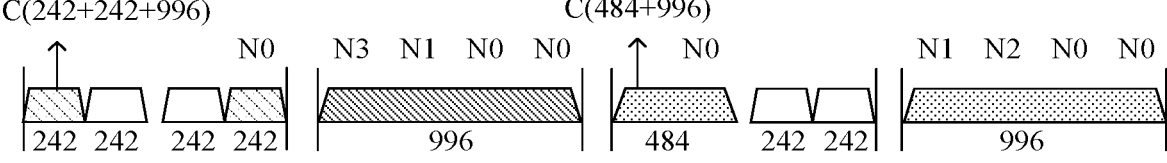
FIG. 6 is a schematic diagram of an example MRU of 320 MHz according to an embodiment of this application.

For example, a 320 MHz spectrum resource shown in FIG. 6 includes two MRUs, which are denoted as an MRU 1 and an MRU 2 in ascending order of frequencies. A plurality of RUs with a same shadow pattern form one MRU. It can be learned from FIG. 6 that the MRU 1 includes three RUs: a 242-tone RU, a 242-tone RU, and a 996-tone RU. A combination type of the MRU 1 may be denoted as C(242+242+996). The MRU 2 includes two RUs: a 484-tone RU and a 996-tone RU. A combination type of the MRU 2 may be denoted as C(484+996). There are four users on the MRU 1 and three users on the MRU 2. A quantity of users or a quantity of user fields may be denoted as Nx, where x is a quantity of user fields. For example, three user fields are denoted as N3, and one user field is denoted as N1. It should be understood that, that there are four users on the MRU 1 means that a sum of quantities of user fields corresponding to a plurality of RUs included in the MRU 1 is 4, and that there are three users on an MRU 2 means that a sum of quantities of user fields corresponding to a plurality of RUs included in the MRU 2 is 3.

The CC described in the 802.11ax standard is used, where resource allocation information of an odd-numbered channel (that is, an m-bit sequence in the resource allocation table) is set on the CC 1, and resource allocation information of an even-numbered channel is set on the CC 2. Possible CCs corresponding to FIG. 6 are shown in Table 11.

TABLE 11

| CC 1 | C(242 + 242 + 996) | else | N3 | N0 | C(484 + 996) | else | N1 | N0 |
|------|--------------------|------|----|----|--------------|------|----|----|
| CC 2 | else | N0 | N1 | N0 | N0 | else | N2 | N0 |

In Table 11, Nx indicates that the entry in Table 10 is used, and indicates a quantity of user fields (a quantity of users) corresponding to the resource allocation subfield. C(242+242+996) uses the entry in Table 9. It should be understood that an RU with a blank part in FIG. 6 indicates that the RU does not belong to the MRU 1 or the MRU 2, and is therefore denoted as "else" herein, which indicates that the RU does not belong to an entry in Table 9 and Table 10. For example, an 8-bit sequence carried in a resource allocation subfield corresponding to "else" may be a bit sequence defined in Table 1.

Table 12 shows another form of Table 11. It should be understood that else in Table 12 is indicated by "01110001" defined in Table 1.

TABLE 12

| CC 1 | 11110010 | 01110001 | 11100011 | 11100000 | 11110011 | 01110001 | 11100001 | 11100000 |
|------|----------|----------|----------|----------|----------|----------|----------|----------|
| CC 2 | 01110001 | 11100000 | 11100001 | 11100000 | 11100000 | 01110001 | 11100010 | 11100000 |

It should be understood that a total quantity of users on the MRU is a sum of quantities of user fields corresponding to resource allocation subfields corresponding to all 242-tone RUs corresponding to the MRU. It should be noted that a quantity of user fields corresponding to a resource allocation subfield corresponding to each 242-tone RU is not limited in embodiments of this application. For example, possible CCs corresponding to the CCs in FIG. 6 are shown in Table 13. A difference between Table 13 and Table 11 lies in that different quantities of user fields in Table 13 and Table 11 correspond to the same resource allocation subfield.

TABLE 13

| CC 1 | C(242 + 242 + 996) | else | N2 | N0 | C(484 + 996) | else | N1 | N1 |
|------|--------------------|------|----|----|--------------|------|----|----|
| CC 2 | else | N2 | N0 | N0 | N0 | else | N1 | N0 |

It should be noted that, although a case in which a plurality of MRUs do not overlap is used as an example in FIG. 6, the solution of the first example is also applicable to a case in which a plurality of MRUs overlap. "Overlap" herein means that an RU included in an MRU is in a bandwidth range in which another MRU is located. In other words, "overlap" means that RUs included in K remaining MRUs exist in a frequency band range in which one MRU is located. It should be understood that, if K is equal to 1, there is one time of overlapping on the MRU; or if K is equal to i, there are i times of overlapping on the MRU.

Figure 7:
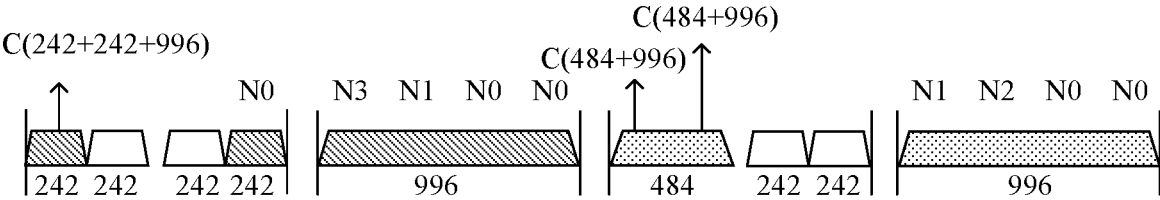
FIG. 7 is a schematic diagram of an example MRU of 320 MHz according to an embodiment of this application.

For example, a 320 MHz spectrum resource shown in FIG. 7 includes two MRUs, which are denoted as an MRU 1 and an MRU 2 in ascending order of frequencies. A plurality of RUs with a same shadow pattern form one MRU. It can be seen from FIG. 7 that there is one time of overlapping between the MRU 1 and the MRU 2. The MRU 1 includes two RUs: a 996-tone RU and a 484-tone RU. A combination type of the MRU 1 may be denoted as C(996+484). An MRU 2 includes three RUs: a 484-tone RU, a 996-tone RU, and a 996-tone RU. A combination type of the MRU 2 may be denoted as C(484+996+996). Three users perform MU-MIMO transmission on the MRU 1. Two users perform MU-MIMO transmission on the MRU 2.

According to the solution of the first example, the CC in the 802.11ax standard is used, and possible CCs corresponding to CCs in FIG. 7 are shown in Table 14.

TABLE 14

| CC 1 | C(484 + 996) | N1 | C(484 + 996 + 996) | N0 | N0 | N0 | N0 | N0 |
|------|--------------|----|--------------------|----|----|----|----|----|
| CC 2 | N2 | N0 | N2 | N0 | N0 | N0 | N2 | N0 |

In addition, it should be noted that the solution of the first example has a load balancing function. To be specific, different entries in Table 10 may be carried in resource unit allocation subfields corresponding to different 242-tone RUs, so that specific quantities of user fields correspond to the CC 1 and the CC 2.

In a second example, the first indication information is carried in a resource allocation subfield corresponding to an RU that first appears in the plurality of RUs included in the MRU, and a resource allocation subfield corresponding to an RU other than the first RU in the MRU carries the second indication information. In other words, the resource allocation subfield corresponding to each 242-tone RU in the RU that first appears in the plurality of RUs included in the MRU uses the entry in Table 9. Resource allocation subfields corresponding to all remaining 242-tone RUs in the MRU other than the RU that first appears use the entry shown in Table 10.

For example, a 320 MHz spectrum resource shown in FIG. 6 is used and includes the MRU 1 and the MRU 2. There are four users on the MRU 1, and there are three users on the MRU 2. In this example, because an RU that first appears in a plurality of RUs included in the MRU 1 is the first 242-tone RU, implementation of the first indication information and the second indication information is the same as that in the first example. In other words, an indication manner of a combination type indication and a quantity of user fields in the MRU 1 is the same as that in Table 11. An RU that first appears in a plurality of RUs included in the MRU 2 is a 484-tone RU. Therefore, the first indication information is carried in resource allocation subfields corresponding to two 242-tone RUs included in the 484-tone RU. For example, refer to FIG. 7.

The CC in the 802.11ax standard is used, and possible CCs corresponding to CCs in FIG. 7 are shown in Table 15.

TABLE 15

| CC 1 | C(242 + 242 + 996) | else | N3 | N0 | C(484 + 996) | else | N1 | N0 |
|------|--------------------|------|----|----|--------------|------|----|----|
| CC 2 | else | N0 | N1 | N0 | C(484 + 996) | else | N2 | N0 |

Table 16 shows another form of Table 15, where else in Table 16 is indicated by "01110001" defined in Table 1.

TABLE 16

| CC 1 | 11110010 | 01110001 | 11100011 | 11100000 | 11110011 | 01110001 | 11100001 | 11100000 |
| CC 2 | 01110001 | 11100000 | 11100001 | 11100000 | 11110011 | 01110001 | 11100010 | 11100000 |

It should be understood that, similar to the solution of the first example, in the solution of the second example, a quantity of user fields corresponding to a resource allocation subfield corresponding to each 242-tone RU is not limited either, provided that quantities of user fields corresponding to the CC 1 and the CC 2 are balanced.

For example, possible CCs corresponding to CCs in FIG. 7 are shown in Table 17. A difference between Table 17 and Table 15 lies in that different quantities of user fields in Table 17 and Table 15 correspond to the same resource allocation subfield.

TABLE 17

| CC 1 | C(242 + 242 + 996) | else | N2 | N0 | C(484 + 996) | else | N1 | N1 |
| CC 2 | else | | N2 | N0 | N0 | C(484 + 996) | else | N1 | N0 |

In a third example, the first indication information is carried in at lease one resource allocation subfield corresponding to a smallest RU that first appears in the plurality of RUs included in the MRU, and a resource allocation subfield corresponding to an RU other than the smallest RU in the MRU carries the second indication information. In other words, the resource allocation subfield corresponding to each 242-tone RU included in the smallest RU of the plurality of RUs included in the MRU uses an entry shown in Table 9. Resource allocation subfields corresponding to a plurality of remaining 242-tone RUs other than the smallest RU in the MRU use the entry shown in Table 10.

For example, a 320 MHz spectrum resource shown in FIG. 6 is used and includes the MRU 1 and the MRU 2. There are four users on the MRU 1, and there are three users on the MRU 2. In this example, because a smallest RU of a plurality of RUs included in the MRU 1 is the first 242-tone RU, implementation of the first indication information and the second indication information is the same as that in the first example. In other words, an indication manner of a combination type indication and a quantity of user fields in the MRU 1 is the same as that in Table 11. A smallest RU of a plurality of RUs included in the MRU 2 is a 484-tone RU. Therefore, implementations of the first indication information and the second indication information are as shown in the second example. To be specific, a combination type indication of the MRU 2 is carried in resource allocation subfields corresponding to two 242-tone RUs in the 484-tone RU, and an indication of a quantity of user fields is carried in resource allocation subfields corresponding to a plurality of 242-tone RUs other than the 484-tone RU, for example, as shown in Table 15, Table 16, or Table 17. Details are not described herein again.

In a fourth example, the first indication information is carried in a resource allocation subfield corresponding to the first 242-tone RU in a smallest RU of the plurality of RUs included in the MRU, and resource allocation subfields corresponding to RUs other than the first 242-tone RU in the smallest RU in the MRU carry the second indication information. In other words, the resource allocation subfield corresponding to the first 242-tone RU in the smallest RU of the plurality of RUs included in the MRU uses the entry shown in Table 9. Resource allocation subfields corresponding to remaining 242-tone RUs in the MRU other than the first 242-tone RU in the smallest RU use the entry shown in Table 10.

For example, a 320 MHz spectrum resource shown in FIG. 6 is used and includes the MRU 1 and the MRU 2. There are four users on the MRU 1, and there are three users on the MRU 2. In this example, because a smallest RU of a plurality of RUs included in the MRU 1 is the first 242-tone RU, an indication manner of a combination type indication and a quantity of user fields in the MRU 1 is the same as that in Table 11. A smallest RU of a plurality of RUs included in the MRU 2 is a 484-tone RU. In other words, a combination type indication of the MRU 2 is carried in a resource allocation subfield corresponding to the first 242-tone RU in the 484-tone RU. Therefore, implementation of the first indication information and the second indication information is the same as that in the first example. In other words, an indication manner of a combination type indication and a quantity of user fields in the MRU 2 are the same as those in Table 11. Details are not described herein again.

Solution 2: An m-bit sequence in a resource allocation information table indicates a combination type of an MRU, and a quantity of users corresponding to the MRU is indicated by a field other than a resource allocation subfield. In other words, an indication of an MRU combination type uses the entry in the foregoing Table 9 in the solution 1. A quantity of users that corresponds to the MRU is indicated by a field (for example, a U-SIG field and an EHT-SIG common field) other than the resource allocation subfield. In other words, in the procedure shown in FIG. 5, an implementation of the first indication information is the same as the implementation of the first indication information in the solution 1, and details are not described herein again. The second indication information is carried in a field in the PPDU other than the resource allocation subfield. For example, the second indication information may be carried in the U-SIG field and/or the EHT-SIG common field.

Figure 8:
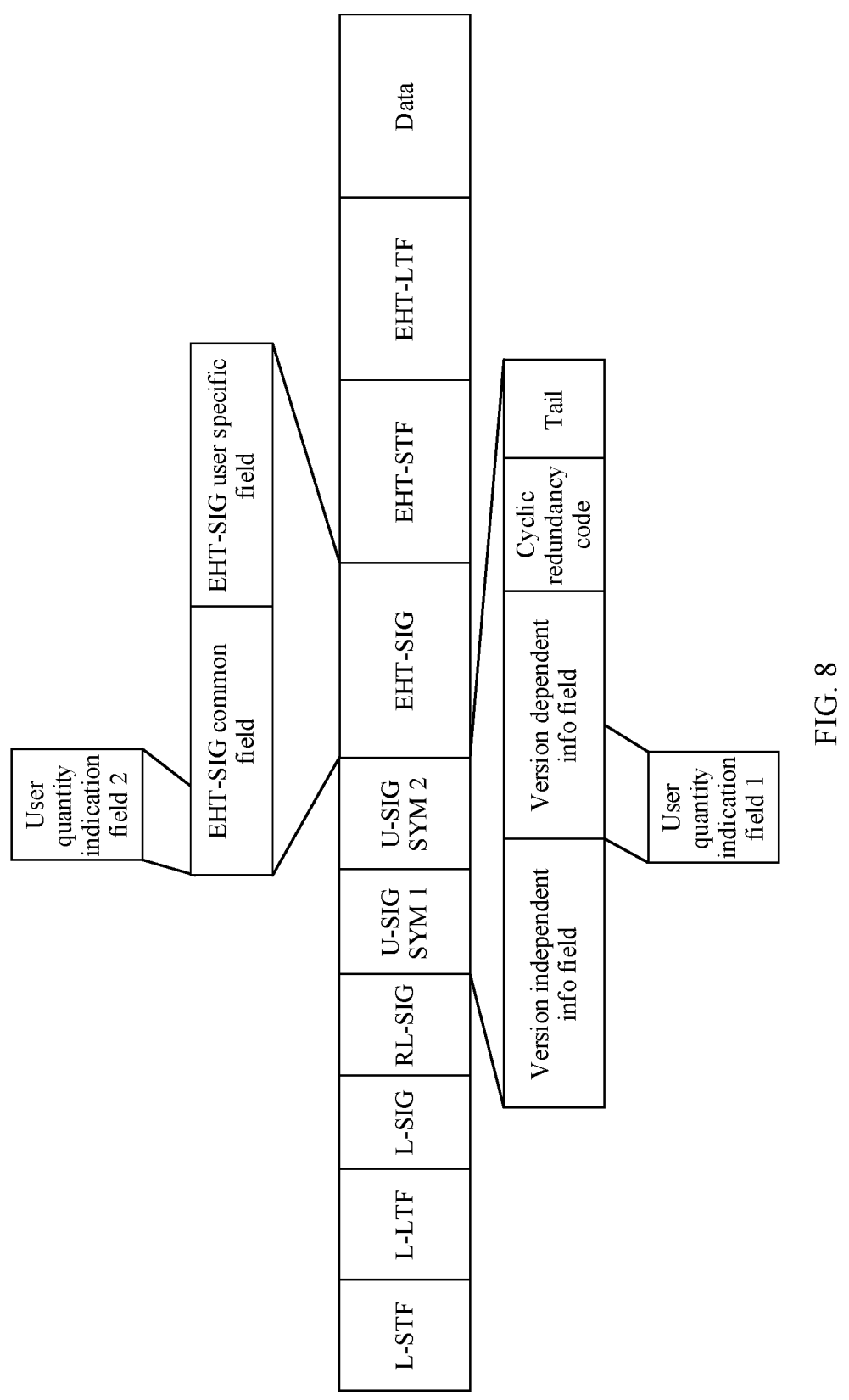
FIG. 8 is a schematic diagram of a frame structure of an HE MU PPDU according to an embodiment of this application.

For example, in the solution 2, Y bits in the U-SIG field may indicate a quantity of MRUs in the transmission bandwidth, and Y*M bits in the EHT-SIG common field may indicate a quantity of users that corresponds to at least one MRU, where M indicates the quantity of users corresponding to one MRU. It should be understood that the Y bits in the U-SIG field and the Y*M bits in the EHT-SIG common field together indicate quantities of users corresponding to Y MRUs. From this perspective, it may be considered that the U-SIG field includes a user quantity indication field 1, the EHT-SIG common field includes a user quantity indication field 2, and the user quantity indication field 1 and the user quantity indication field 2 indicate a quantity of users corresponding to the MRUs. Refer to FIG. 8. It should be noted that the user quantity indication field 2 is located before a user field, and each MRU corresponds to one M-bit user quantity indication field 2.

Load balancing is considered. In other words, a quantity of user fields that corresponds to the CC 1 is the same as a quantity of user fields that corresponds to the CC 2, or a difference between the quantity of user fields that corresponds to the CC 1 and the quantity of user fields that corresponds to the CC 2 is minimized. For example, for one MRU, a part of M bits may indicate the quantity of user fields that corresponds to the CC 1, and another part of the M bits may indicate the quantity of user fields that corresponds to the CC 2. For example, M is equal to 6. In this embodiment of this application, a value of the first three bits in the six bits may indicate the quantity of user fields that corresponds to the CC 1, and a value of the last three bits in the six bits may indicate the quantity of user fields corresponding to the CC 2. For example, if the value of the first three bits in the six bits is 0, the value of the last three bits in the six bits is 0, it indicates that the quantity of user fields that corresponds to the CC 1 is 0, and a quantity of user fields corresponding to the CC 2 is 0. If the value of the first three bits in the six bits is 1, the value of the last three bits in the six bits is 1, it indicates that the quantity of user fields that corresponds to the CC 1 is 1, and the quantity of user fields that corresponds to the CC 2 is 0.

In a possible implementation, a location of the user field may be the first 242-tone RU that corresponds to the CC 1 and the CC 2, and the user field may carry user information.

For example, the 320 MHz spectrum resource shown in FIG. 6 is used and includes the MRU 1 and the MRU 2. There are four users on the MRU 1, and there are three users on the MRU 2. The manner of carrying the first indication information in the foregoing solution 1 is used. To be specific, the indication manner of the combination types of the MRU 1 and the MRU 2 in the foregoing solution 1 is used. Specifically, any manner in the first example to the fourth example in the foregoing solution 1 may be used. There are the MRU 1 and the MRU 2, in other words, there are two MRUs, so Y is equal to 2. It is assumed that M=6, then 2*6 bits in the EHT-SIG common field indicate quantities of users corresponding to the two MRUs.

For another example, the second indication information may be carried in an EHT-SIG common field. For example, a new field, for example, referred to as a first field, is added to the EHT common field. The first field occupies K bits, and a value of the K bits may indicate an MRU combination type and a corresponding quantity of users. For example, if K=4*6, it may be considered that there are four MRUs, and the first field indicates, by using the K bits, quantities of users corresponding to the four MRUs.

Solution 3: One m-bit sequence in a resource allocation information table indicates a quantity of user fields corresponding to a resource allocation subfield, and an MRU combination type is indicated by a field other than the resource allocation subfield. In other words, the quantity of user fields corresponding to the MRU uses the entry in the foregoing Table 10, and the MRU combination type is indicated by a field (for example, a U-SIG field or an EHT-SIG common field) other than the resource allocation subfield. In other words, in the procedure shown in FIG. 5, an implementation of the second indication information is the same as the implementation of the second indication information in the solution 1, and details are not described herein again. The first indication information is carried in a field in the PPDU other than a resource allocation subfield. For example, the first indication information may be carried in an indication in a bandwidth field in the U-SIG field, an indication in a newly added field in the EHT-SIG common field, or an indication in a user-specific field in the EHT-SIG.

Solution 4: An m-bit sequence in the resource allocation information table indicates an RU in 80 MHz that a 996-tone RU corresponding to the m-bit sequence is to be combined with, or it may be considered as that the m-bit sequence indicates 80 MHz in which the RU to be combined with the 996-tone RU is located, in other words, a location of the RU to be combined with the 996-tone RU in the transmission bandwidth. Another m-bit sequence in the resource allocation information table indicates a quantity of user fields that corresponds to the resource allocation subfield. It should be noted that this solution is used for a combination indication of an MRU including a 996-tone RU. For example, as shown in Table 8, when a transmission bandwidth is greater than or equal to 160 MHz, that is, for cross-80 MHz MRU combination, MRU combination except the combination type "242+484+242+484" may be considered as a combination of a 996-tone RU and an RU of another size. Therefore, in this embodiment of this application, a combination location for the 996-tone RU included in the MRU may be indicated, for example, 80 MHz in which an RU to be combined is located, to implement MRU combination indication.

In other words, an entry for indicating an MRU that a corresponding 996-tone RU is to be combined with may be added to Table 1. For example, Table 18 shows possible entries that are in the resource allocation information table provided in this embodiment of this application and that indicate a specific MRU that the 996-tone RU included in the MRU is to be combined with. It should be understood that bit sequences in Table 18 are examples of the reserved bit sequence in Table 1.

TABLE 18

| Index of a new entry of a resource unit allocation subfield (B7-B0) | Description (indicating 80 MHz in which an RU to be combined with the 996-tone RU is located) | Quantity of entries |
|---|---|---|
| 01110100 | The corresponding 996-tone RU is to be combined with an RU in the first 80 MHz according to an ascending order of frequencies | 1 |
| 01110101 | The corresponding 996-tone RU is to be combined with an RU in the second 80 MHz according to an ascending order of frequencies | 1 |
| 01110110 | The corresponding 996-tone RU is to be combined with an RU in the third 80 MHz according to an ascending order of frequencies | 1 |
| 01110111 | The corresponding 996-tone RU is to be combined with an RU in the fourth 80 MHz according to an ascending order of frequencies | 1 |

It should be understood that Table 18 lists four entries, and is applicable to a case in which the transmission bandwidth is 320 MHz. In this solution, the AP may indicate, by using the entry in Table 18 and the entry in Table 10, one STA or more STAs to perform MU-MIMO data transmission on the MRU.

With reference to the accompanying drawings, the following describes, by using a possible structure of a PPDU as an example, a resource unit combination indication method implemented based on Table 18 and Table 10.

Figure 9:
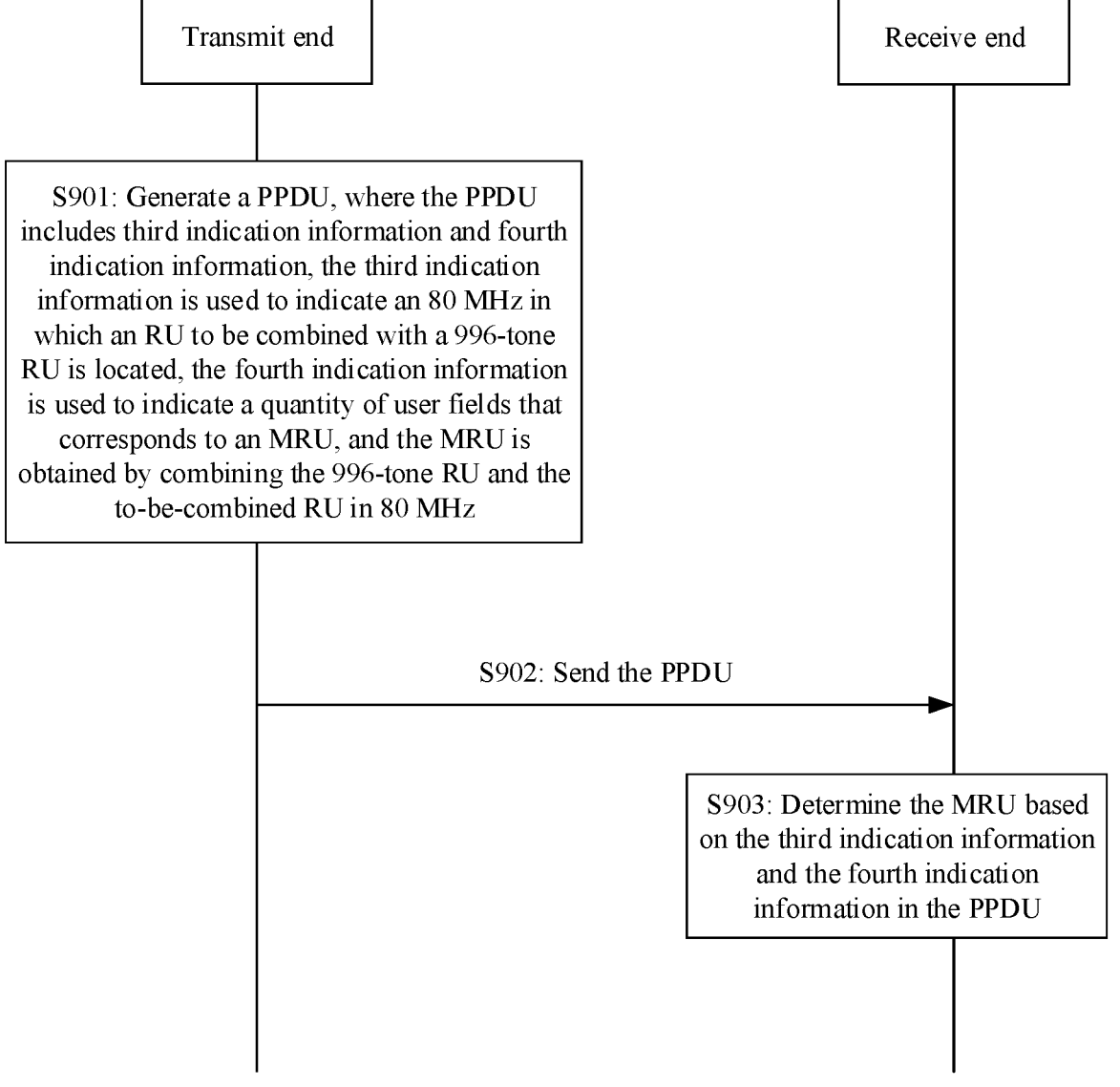
FIG. 9 is a schematic diagram of an example of a resource unit combination indication method according to an embodiment of this application.

FIG. 9 is a schematic flowchart of a resource unit combination indication method according to an embodiment of this application. The method may be applied to the scenario shown in FIG. 1. Certainly, the method may also be applied to another possible communication scenario or communication system. This is not limited in embodiments of this application. It should be understood that the method relates to a transmitting device and a receiving device. In the description of this specification, the transmitting device is also referred to as a transmit end, and the receiving device is also referred to as a receive end. In the following description, an example in which the transmit end is an AP and the receive end is a STA is used. The method includes the following steps.

S901: The transmit end generates a PPDU. The PPDU includes third indication information and fourth indication information. The third indication information indicates an 80 MHz in which an RU to be combined with a 996-tone RU is located. The fourth indication information indicates a quantity of user fields that corresponds to an MRU. The MRU is obtained by combining the 996-tone RU and the to-be-combined RU in 80 MHz.

S902: The transmit end sends the PPDU, and the receive end receives the PPDU.

S903: The receive end determines the MRU based on the third indication information and the fourth indication information in the PPDU.

It should be understood that the third indication information may be implemented by using the entry in Table 18, and indicates 80 MHz in which the RU is to be combined with the 996-tone RU. The fourth indication information may be implemented by using the entry in Table 10, and indicates the quantity of user fields that corresponds to the MRU. It should be understood that the fourth indication information may implicitly indicate a specific location, in 80 MHz, of the RU to be combined with the 996-tone RU.

In a possible implementation, the fourth indication information may be carried in N resource allocation subfields corresponding to at least one RU combined with the 996-tone RU, in other words, each of the N resource allocation subfields uses the entry in Table 10. The third indication information may be carried in some or all of four resource unit allocation subfields corresponding to the 996-tone RU. The following lists several manners of carrying the third indication information.

Manner 1: The third indication information is carried in the four resource unit allocation subfields corresponding to the 996-tone RU. Values of the four resource unit allocation subfields are the same, and indicate the 996-tone RU to combine with a first MRU in an $i^{th}$ 80 MHz, where i is greater than or equal to 1.

Figure 10:
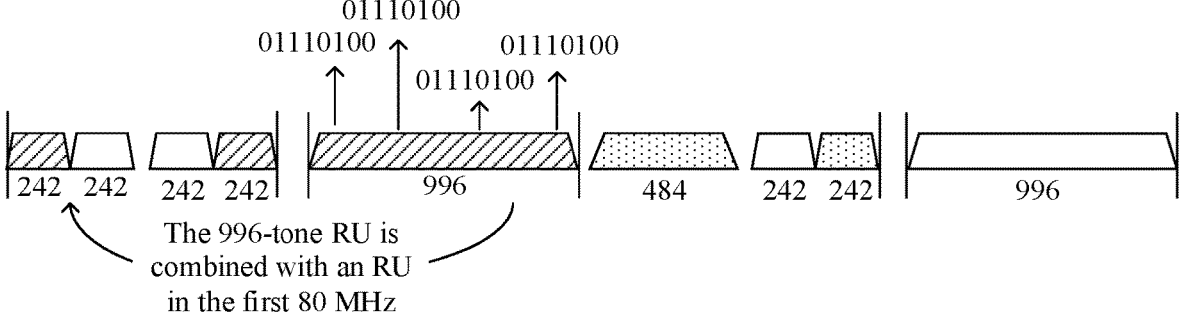
FIG. 10 is a schematic diagram of an example MRU of 320 MHz according to an embodiment of this application.

For example, a 320 MHz spectrum resource shown in FIG. 10 includes two MRUs, which are denoted as an MRU 1 and an MRU 2 in ascending order of frequencies. A plurality of RUs with a same shadow pattern form one MRU. It can be learned from FIG. 10 that the MRU 1 includes three RUs: a 242-tone RU, a 242-tone RU, and a 996-tone RU. The 242-tone RU and the 242-tone RU belong to the first 80 MHz, that is, the 996-tone RU is combined with the two RUs in the first 80 MHz. The MRU 2 includes two RUs: 484-tone RU and 242-tone RU. There are three users that perform MU-MIMO transmission on the MRU 1. It should be understood that a sum of quantities of user fields corresponding to the plurality of RUs included in the MRU 1 is 4. Because the MRU 2 does not include a 996-tone RU, no further description is provided herein.

The CC in the 802.11ax standard is used, and possible CCs corresponding to CCs in FIG. 10 are shown in Table 19.

TABLE 19

| CC 1 | N1 | else | 01110100 | 01110100 | * | else | else | else |
| CC 2 | else | N2 | 01110100 | 01110100 | * | * | else | else |

Nx in Table 19, that is, a quantity of user fields, may use the entry in the foregoing Table 10. In other words, implementation of the fourth indication information is the same as that in the solution 1. Details are not described herein again. The third indication information is implemented by using the entry in Table 18. For example, "01110100" in Table 18 indicates that a corresponding 996-tone RU is combined with at least one RU (that is, the first 242-tone RU and the fourth 242-tone RU) in the first 80 MHz. Resource allocation subfields corresponding to the first 242-tone RU and the fourth 242-tone RU carry fourth indication information, which indicates a quantity of corresponding user fields, and indicates that the first 242-tone RU and the fourth 242-tone RU are RUs to be combined. It should be understood that an RU with a blank part in FIG. 10 indicates that the RU does not belong to the MRU 1 or the MRU 2. Therefore, the RU is denoted as "else" herein to indicate that the RU does not belong to the entry in Table 18 and Table 10. Because the MRU 2 does not include the 996-tone RU, a CC corresponding to the MRU 2 is indicated by "*". Specifically, any one of the first example to the fourth example in the foregoing solution 1 may be used for indication herein. This is not limited in this embodiment of this application.

Certainly, the fourth indication information may also use the 8-bit sequence defined in Table 1. For example, Table 20 is another form of Table 19. It should be understood that resource allocation subfields separately corresponding to the first 242-tone RU and the fourth 242-tone RU in Table 20 may use the 8-bit sequence in Table 1, for example, "11000y2y1y0" that may be denoted as C(242, 2).

TABLE 20

| CC 1 | C (242, 2) | else | 01110100 | 01110100 | * | else | else | else |
| CC 2 | else | C (242, 2) | 01110100 | 01110100 | * | * | else | else |

C(242, 2) indicates that a quantity of corresponding user fields is 2, resource allocation subfields corresponding to the first 242-tone RU and the fourth 242-tone RU may each correspond to two user fields, and the two user fields carry respective user information, for example, a STA 1 ID and a STA 2 ID.

It should be understood that one 996-tone RU cannot be combined with the 996-tone RU itself. Therefore, Table 21 shows a variation of Table 18.

TABLE 21

| Index of a new entry of a resource unit allocation subfield (B7-B0) | Description (indicating 80 MHz in which an RU to be combined with the 996-tone RU is located) | Quantity of entries |
|---|---|---|
| 01110100 | The corresponding 996-tone RU is to be combined with a to-be-combined RU in the first 80 MHz other than the 996-tone RU itself | 1 |
| 01110101 | The corresponding 996-tone RU is to be combined with a to-be-combined RU in the second 80 MHz other than the 996-tone RU itself | 1 |
| 01110110 | The corresponding 996-tone RU is to be combined with a to-be-combined RU in the third 80 MHz other than the 996-tone RU itself | 1 |

Compared with Table 18, there are fewer entries in Table 21. Therefore, entries can be further reduced by using Table 21.

In this case, the manner of carrying the third indication information may be a manner 2. To be specific, the third indication information is carried in four resource unit allocation subfields corresponding to the 996-tone RU. Values of the four resource unit allocation subfields are the same, and indicate the 996-tone RU to combine with the first MRU in an $i^{th}$ 80 MHz other than the 996-tone RU, where i is greater than or equal to 1.

For example, the 320 MHz spectrum resource shown in FIG. 10 is used, and the CC in the 802.11ax standard is used. Possible CCs corresponding to CCs in FIG. 10 are shown in Table 22.

TABLE 22

| CC 1 | N1 | else | 01110100 | 01110100 | * | else | else | else |
| CC 2 | else | N2 | 01110100 | 01110100 | * | * | else | else |

Nx in Table 22, that is, a quantity of user fields, may use the entry in the foregoing Table 10. In other words, implementation of the fourth indication information is the same as that in the solution 1. Details are not described herein again. The third indication information is implemented by using the entry in Table 21. For example, "01110100" in Table 21 indicates that a corresponding 996-tone RU is combined with at least one RU (that is, the first 242-tone RU and the fourth 242-tone RU) in the first 80 MHz other than the corresponding 996-tone RU itself.

In an alternative solution of Table 18 and Table 21, one resource allocation subfield of four resource allocation subfields corresponding to the 996-tone RU may indicate a combination location of the 996-tone RU in the MRU. For example, Table 23 shows possible entries that are in the resource allocation information table provided in this embodiment of this application and that indicate a specific MRU that the 996-tone RU included in the MRU is to be combined with. It should be understood that bit sequences in Table 23 are examples of the reserved bit sequence in Table 1.

TABLE 23

| Index of a new entry of a resource unit allocation subfield (B7-B0) | Description (indicating 80 MHz in which an RU to be combined with the 996-tone RU is located) | Entry Quantity |
| --- | --- | --- |
| 01110100 | A corresponding 242-tone RU belongs to one 996-tone RU, and an ith 242-tone RU in the 996-tone RU indicates that the 996-tone RU is combined with the ith 80 MHz | 1 |

Compared with Table 21, a quantity of entries in Table 23 is further reduced. In this solution, the AP may indicate, by using the entry in Table 23 and the entry in Table 10, the MRU including the 996-tone RU.

The 996-tone RU includes four 242-tone RUs. The 80 MHz bandwidth, among four 80 MHz bandwidths, in which at least one RU is to be combined with the 996-tone RU may be indicated by using one 242-tone RU of the four 242-tone RUs in the 996-tone RU. In this case, the manner of carrying the third indication information may be a manner 3. To be specific, the third indication information is carried in an ith resource unit allocation subfield of four resource unit allocation subfields corresponding to the 996-tone RU, to indicate that the 996-tone RU is combined with at least one RU in the ith 80 MHz, where i is greater than or equal to 1.

Figure 11:
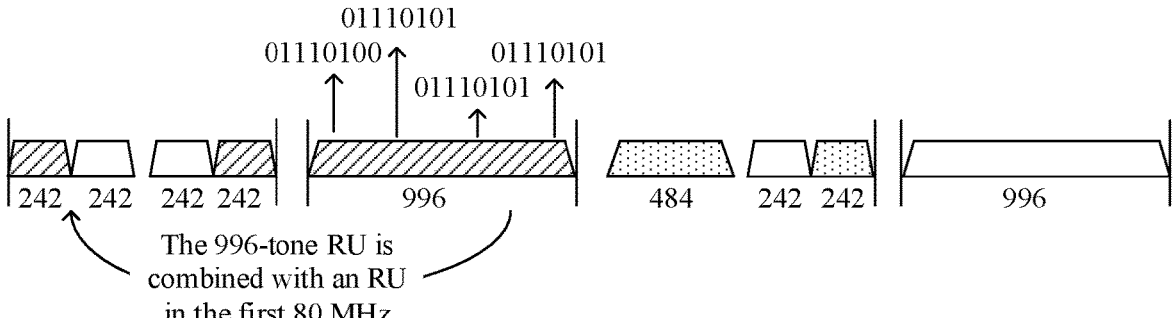
FIG. 11 is a schematic diagram of an example MRU of 320 MHz according to an embodiment of this application.

For example, for a 320 MHz spectrum resource shown in FIG. 11, the entry in Table 23 is used. Refer to FIG. 11. The CC in the 802.11ax standard is used, and possible CCs corresponding to CCs in FIG. 11 are shown in Table 22.

TABLE 24

| CC 1 | N1 | else | 01110100 | 01110101 | * | else | else | else |
| CC 2 | else | N2 | 01110101 | 01110101 | * | * | else | else |

Nx in Table 24, that is, a quantity of user fields, may use the entry in the foregoing Table 10. In other words, implementation of the fourth indication information is the same as that in the solution 1. Details are not described herein again. The third indication information is implemented by using the entry in Table 23. For example, "01110100" in Table 23 indicates that a corresponding 242-tone RU belongs to one 996-tone RU. The 242-tone RU is the first 242-tone RU in the 996-tone RU. Therefore, the 996-tone RU may be indicated to combine with at least one RU (that is, the first 242-tone RU and the fourth 242-tone RU) in the first 80 MHz. It should be understood that entries carried in resource allocation subfields corresponding to remaining three 242-tone RUs other than the first 242-tone RU in the 996-tone RU are entries that do not belong to Table 23. For example, "01110011" in Table 1 may indicate that the corresponding 996-tone RU belongs to one MRU, and the resource unit allocation subfield corresponds to 0 user field.

The foregoing Table 18, Table 21, and Table 23 may all indicate that one RU or one MRU exists in 80 MHz, and the RU or the MRU is combined with the 996-tone RU to form a new MRU. When there are a plurality of MRUs in 80 MHz, in this embodiment of this application, an entry shown in Table 25 may indicate that the 996-tone RU is combined with one MRU in one 80 MHz.

For example, Table 25 shows possible entries that are in the resource allocation information table provided in this embodiment of this application and that indicate a specific MRU that the 996-tone RU included in the MRU is combined with and 80 MHz in which the specific MRU is located. It should be understood that bit sequences in Table 25 are examples of the reserved bit sequence in Table 1.

TABLE 25

| Index of a new entry of a resource unit allocation subfield (B7-B0) | Description (indicating 80 MHz in which an RU to be combined with the 996-tone RU is located) | Entry Quantity |
| --- | --- | --- |
| 01110100 | A corresponding 242-tone RU belongs to one 996-tone RU, and an ith 242-tone RU in the 996-tone RU indicates that the 996-tone RU is combined with the first 40 MHz in the ith 80 MHz | 1 |
| 01110101 | A corresponding 242-tone RU belongs to one 996-tone RU, and an ith 242-tone RU in the 996-tone RU indicates that the 996-tone RU is combined with the second 40 MHz in the ith 80 MHz | 1 |
| 01110110 | A corresponding 242-tone RU belongs to one 996-tone RU, and an ith 242-tone RU in the 996-tone RU indicates that the 996-tone RU is combined with the ith 80 MHz | 1 |
| 01110111 | The corresponding 996-tone RU belongs to one MRU | 1 |

It should be understood that, if an ith 80 MHz corresponding to the ith 242-tone RU in one 996-tone RU is not combined with the 996-tone RU, the ith 242-tone RU may use an entry "01110111" in Table 25, to indicate only that the 996-tone RU belongs to one MRU, that is, the 996-tone RU belongs to MRU combination.

In this case, the third indication information may be carried in a manner 4. To be specific, the third indication information is carried in the ith resource unit allocation subfield in four resource unit allocation subfields corresponding to the 996-tone RU, to indicate that the 996-tone RU is combined with a jth 40 MHz of the ith 80 MHz, where i is greater than or equal to 1, and j is greater than or equal to 1.

Figure 12:
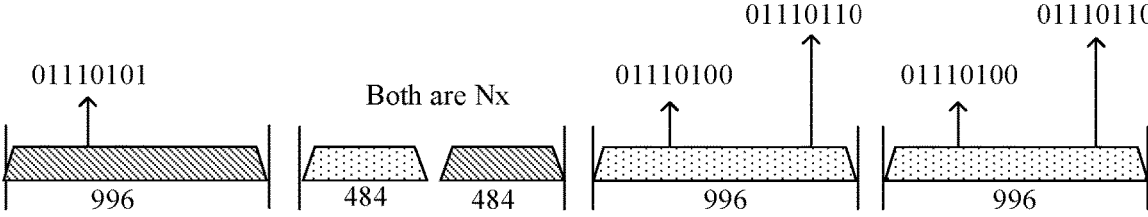
FIG. 12 is a schematic diagram of an example MRU of 320 MHz according to an embodiment of this application.

For example, a 320 MHz spectrum resource shown in FIG. 12 includes two MRUs denoted as an MRU 1 and an MRU 2. A plurality of RUs with a same shadow pattern form one MRU. It can be learned from FIG. 12 that the MRU 1 includes two RUs: a 996-tone RU and a 484-tone RU. The MRU 2 includes three RUs: a 484-tone RU, a 996-tone RU, and a 996-tone RU. It should be understood that the second 80 MHz includes two MRUs: a first 484-tone RU and a second 484-tone RU. The first 484-tone RU is combined with the 996-tone RU in the MRU 1, and the second 484-tone RU is combined with two 996-tone RUs in the MRU 2.

The CC in the 802.11ax standard is used, and possible CCs corresponding to CCs in FIG. 12 are shown in Table 26.

80 MHz. For example, the combination indication for the MRU within 80 MHz may traverse all combination combinations and a quantity of users within 80 MHz. This is not limited in embodiments of this application.

Solution 5: An m-bit sequence in the resource allocation information table indicates that a corresponding 242-tone RU belongs to one MRU, and the m-bit sequence further indicates a quantity of user fields that corresponds to a resource unit allocation subfield corresponding to the m-bit sequence. Different MRUs may be identified by using combination identifiers. To be specific, the MRU to which the 242-tone RU corresponding to indication of the m-bit sequence belongs may be indicated by indicating a combination identifier of the MRU to which the 242-tone RU belongs. It should be understood that the combination identifier herein is used to distinguish between different MRUs.

In other words, an entry for indicating a specific MRU to which the 242-tone RU belongs and a corresponding user field may be added to Table 1. The AP may indicate, by using the entry for indicating the specific MRU to which the 242-tone RU belongs and the quantity of user fields, one STA or more STAs to perform MU-MIMO data transmission on the specific MRU.

For example, Table 27 shows possible entries that are in the resource allocation information table provided in this

TABLE 26

| CC 1 | else | else | Nx | Nx | else | else | else | 01110110 |
| CC 2 | 01110101 | else | Nx | Nx | 01110100 | 01110110 | 01110100 | else |

It should be understood that, corresponding to FIG. 12, if the first 996-tone RU is combined with the second 40 MHz in the second 80 MHz, a resource allocation subfield corresponding to the second 242-tone RU included in the first 996-tone RU carries the entry "01110101" shown in Table 25. Resource allocation subfields corresponding to three remaining 242-tone RUs other than the second 242-tone RU in the first 996-tone RU may carry "01110101", or an entry that does not belong to Table 25, which is indicated by "else" in Table 26. A resource allocation subfield corresponding to the first 40 MHz of the second 80 MHz may indicate a quantity of user fields, may carry the entry in the foregoing Table 10 and indicate a quantity of users corresponding to the MRU 1. Similarly, a resource allocation subfield corresponding to the second 40 MHz in the second 80 MHz may carry the entry in the foregoing Table 10 and indicate a quantity of users corresponding to the MRU 2, both of which are uniformly indicated by "Nx" in Table 26. The third 996-tone RU is combined with the first 40 MHz in the second 80 MHz. Therefore, a resource allocation subfield corresponding to the second 242-tone RU in the third 996-tone RU carries the entry "01110100" shown in Table 25. In addition, the third 996-tone RU is combined with an RU in the fourth 80 MHz. Therefore, a resource allocation subfield corresponding to the fourth 242-tone RU in the third 996-tone RU carries the entry "01110110" shown in Table 25. Similarly, a resource allocation subfield corresponding to the second 242-tone RU in the fourth 996-tone RU carries the entry "01110100" shown in Table 25, and a resource allocation subfield corresponding to the third 242-tone RU in the fourth 996-tone RU carries the entry "01110110" shown in Table 25.

It should be noted that the foregoing combination indication for an MRU greater than 80 MHz does not constitute a limitation on a combination indication for an MRU within embodiment of this application and that indicate a specific MRU to which the 242-tone RU belongs and a quantity of user fields. It should be understood that bit sequences in Table 27 are examples of the reserved bit sequence in Table 1.

TABLE 27

| Index of a new entry of a resource unit allocation subfield (B7-B0) | Description (indicating a specific MRU to which a corresponding 242-tone RU belongs and a corresponding quantity of user fields) | Quantity of entries |
|---|---|---|
| 11100000 | The corresponding 242-tone RU belongs to an MRU, a combination identifier of the MRU is A, and the resource unit allocation subfield corresponds to 0 user field | 1 |
| 11100001 | The corresponding 242-tone RU belongs to an MRU, a combination identifier of the MRU is A, and the resource unit allocation subfield corresponds to 1 user field | 1 |
| 11100010 | The corresponding 242-tone RU belongs to an MRU, a combination identifier of the MRU is A, and the resource unit allocation subfield corresponds to 2 user fields | 1 |
| 11100011 | The corresponding 242-tone RU belongs to an MRU, a combination identifier of the MRU is A, and the resource unit allocation subfield corresponds to 3 user fields | 1 |
| 11100100 | The corresponding 242-tone RU belongs to an MRU, a combination identifier of the MRU is A, and the resource unit allocation subfield corresponds to 4 user fields | 1 |
| 11100101 | The corresponding 242-tone RU belongs to an MRU, a combination identifier of the MRU is A, and the | 1 |

TABLE 27-continued

| Index of a new entry of a resource unit allocation subfield (B7-B0) | Description (indicating a specific MRU to which a corresponding 242-tone RU belongs and a corresponding quantity of user fields) | Quantity of entries |
|---|---|---|
| | resource unit allocation subfield corresponds to 5 user fields | |
| 11100110 | The corresponding 242-tone RU belongs to an MRU, a combination identifier of the MRU is A, and the resource unit allocation subfield corresponds to 6 user fields. | 1 |
| 11100111 | The corresponding 242-tone RU belongs to an MRU, a combination identifier of the MRU is A, and the resource unit allocation subfield corresponds to 7 user fields | 1 |
| 11101000 | The corresponding 242-tone RU belongs to an MRU, a combination identifier of the MRU is A, and the resource unit allocation subfield corresponds to 8 user fields | 1 |
| 11101001-11110001 | The corresponding 242-tone RU belongs to an MRU, a combination identifier of the MRU is B, and the resource unit allocation subfield corresponds to 0/1/2/3/4/5/6/7/8 user field | 9 |
| 11110010-11111011 | The corresponding 242-tone RU belongs to an MRU, a combination identifier of the MRU is C, and the resource unit allocation subfield corresponds to 0/1/2/3/4/5/6/7/8 user fields | 9 |

It should be noted that Table 27 lists three types of combination identifiers: A, B, and C. During specific implementation, more types of combination identifiers may be defined in the resource allocation information table. A quantity of combination identifiers is not limited in embodiments of this application. It should be understood that "11101001-11110001" and "11110010-11111011" in Table 27 each are actually nine entries. To reduce a length of the table, the entries are combined and filled herein.

The bit sequence in Table 27 may be a newly defined bit sequence, or may use the reserved bit sequence in Table 1 for illustration. The reserved bit sequence in Table 1 is used in Table 27 as an example. In embodiments of this application, the STA may be notified of a resource unit combination indication by using the 8-bit sequence in Table 27. Specifically, in embodiments of this application, the 8-bit sequence in Table 27 may be carried in a signal field. In other words, the user is notified of a combination identifier of the MRU and user information corresponding to the MRU by using the signal field.

For example, the 8-bit sequence in Table 27 may be carried in resource allocation subfields corresponding to a plurality of RUs included in the MRU. For example, the 8-bit sequence may be denoted as Nx(A), where Nx indicates a quantity of user fields, and A indicates a combination identifier. For example, N3(A) indicates that the quantity of user fields is 3, and the combination identifier is A. For another example, N2(B) indicates that the quantity of user fields is 2, and the combination identifier is B.

Figure 13:
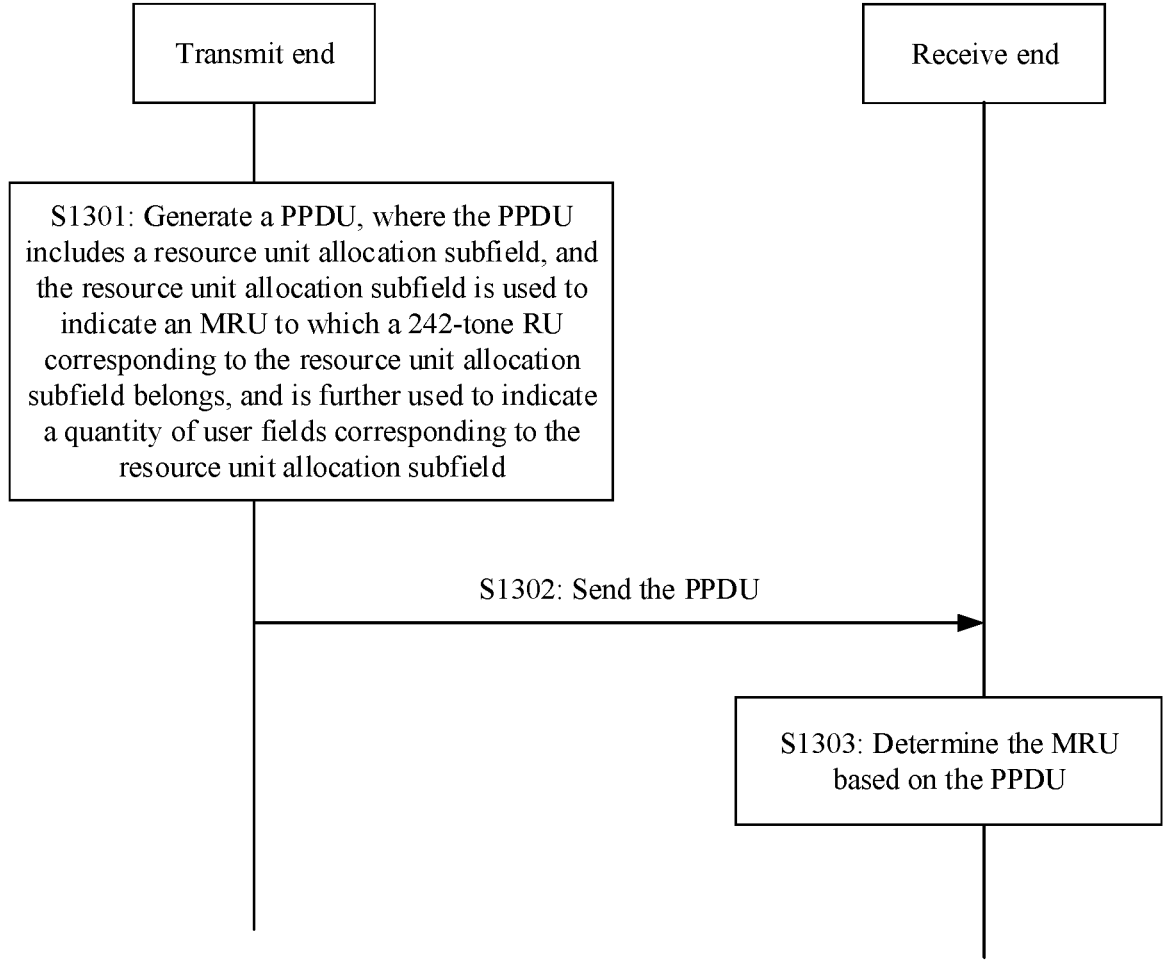
FIG. 13 is a schematic diagram of an example of a resource unit combination indication method according to an embodiment of this application.

In embodiments of this application, the STA may be notified of a resource unit combination indication by using the example of 8-bit sequence in Table 27. FIG. 13 is a schematic flowchart of a resource unit combination indication method according to an embodiment of this application. The method may be applied to the scenario shown in FIG. 1. Certainly, the method may also be applied to another possible communication scenario or communication system. This is not limited in embodiments of this application. The method includes the following steps.

S1301: A transmit end generates a PPDU. The PPDU includes a resource unit allocation subfield. The resource unit allocation subfield indicates an MRU to which a 242-tone RU corresponding to the resource unit allocation subfield belongs, and further indicates a quantity of user fields corresponding to the resource unit allocation subfield.

S1302: The transmit end sends the PPDU.

S1303: The receive end determines the MRU based on the PPDU.

It should be understood that each resource allocation subfield of the M resource unit allocation subfields uses the entry in Table 26. In other words, each resource allocation subfield carries a plurality of 8-bit sequences in Table 26.

Figure 14:
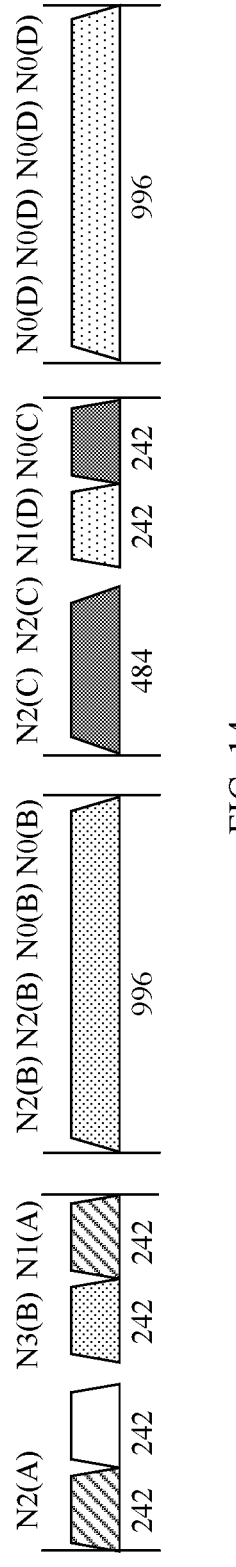
FIG. 14 is a schematic diagram of an example MRU of 320 MHz according to an embodiment of this application.

For example, a 320 MHz spectrum resource shown in FIG. 14 includes four MRUs, which are denoted as an MRU 1, an MRU 2, an MRU 3, and an MRU 4 in ascending order of frequencies. A plurality of RUs with a same shadow pattern form one MRU. In the ascending order of frequencies, a spectrum resource shown in FIG. 14 sequentially includes the first 242-tone RU, the second 242-tone RU, the third 242-tone RU, the fourth 242-tone RU, the first 996-tone RU, the first 484-tone RU, the fifth 242-tone RU, the sixth 242-tone RU, and the second 996-tone RU. It can be learned that the first 242-tone RU and the fourth 242-tone RU are combined to form an MRU 1, the second 242-tone RU and the first 996-tone RU are combined to form an MRU 2, the first 484-tone RU and the sixth 242-tone RU are combined to form an MRU 3, and the fifth 242-tone RU and the second 996-tone RU are combined to form an MRU 4. Every two of the four MRUs, namely, the MRU 1, the MRU 2, the MRU 3, and the MRU 4 may be considered as MRUs with different combination identifiers.

For example, a combination identifier corresponding to the MRU 1 is A, a combination identifier corresponding to the MRU 2 is B, a combination identifier corresponding to the MRU 3 is C, and a combination identifier corresponding to the MRU 4 is D. The CC in the 802.11ax standard is used, and possible CCs corresponding to CCs in FIG. 14 are shown in Table 28.

TABLE 28

| CC 1 | N2 (A) | N3 (B) | N2 (B) | N0 (B) | N2 (C) | N1 (D) | N0 (D) | N0 (D) |
|---|---|---|---|---|---|---|---|---|
| CC 2 | else | N1 (A) | N2 (B) | N0 (B) | N2 (C) | N0 (C) | N0 (D) | N0 (D) |

In Table 28, for example, N2(A) uses the entry in Table 27, to indicate that an RU corresponding to the resource allocation subfield belongs to the combination identifier A, and a corresponding quantity of user fields is 2. It should be understood that an RU with a blank part in FIG. 14 indicates that the RU does not belong to the MRU 1 or the MRU 2, and is therefore denoted as "else" herein, which indicates that the RU does not belong to an entry in Table 27. For example, an 8-bit sequence carried in a resource allocation subfield corresponding to "else" may be a bit sequence defined in Table 1.

It should also be understood that, in a case in which a plurality of MRUs do not overlap, two combination identifiers are sufficient, where the two combination identifiers are reused. When a plurality of MRUs overlap, two combination identifiers or three combination identifiers may be used.

For example, there are four MRUs in FIG. 14, and four corresponding combination identifiers are used in Table 28. In an alternative solution, possible CCs corresponding to CCs in FIG. 14 are shown in Table 29.

TABLE 29

| CC 1 | N2 (A) | N3 (B) | N2 (B) | N0 (B) | N2 (C) | N1 (A) | N0 (A) | N0 (A) |
|------|--------|--------|--------|--------|--------|--------|--------|--------|
| CC 2 | else | N1 (A) | N2 (B) | N0 (B) | N2 (C) | N0 (C) | N0 (A) | N0 (A) |

A difference between Table 29 and Table 28 lies in that, in Table 29, three combination identifiers indicate four MRUs, where the combination identifier A therein is reused. In this way, no more combination identifiers need to be defined, and a quantity of entries in Table 26 may be reduced.

It should be understood that, when one time of overlapping exists in a plurality of MRUs, it means that one or more RUs included in another MRU exist in a frequency range occupied by one MRU. It should be further understood that n times of overlapping means that one or more RUs separately included in other n MRUs exist in a frequency occupied by one MRU. When one time of overlapping exists in at least four MRUs, a combination identifier may be reused to indicate an MRU to which one user or a plurality of users are allocated. In addition, MRUs with at least another two combination identifiers exist between two MRUs belonging to a same combination identifier. As shown in Table 29, four MRUs exist, the combination identifier A is reused to indicate the MRU 4, the combination identifier of the MRU 4 is the same as that of the MRU 1, and MRU 2 and MRU 3 between the MRU 1 and the MRU 4 respectively correspond to the combination identifier B and the combination identifier C.

Figure 15:
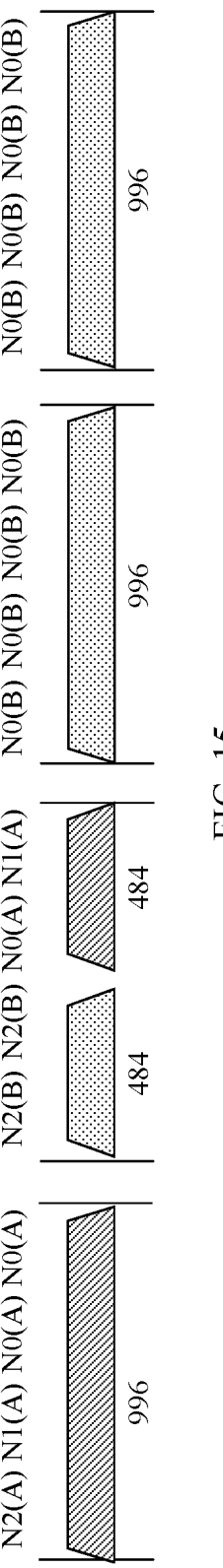
FIG. 15 is a schematic diagram of an example MRU of 320 MHz according to an embodiment of this application.

For another example, a 320 MHz spectrum resource shown in FIG. 15 includes two MRUs: an MRU 1 and an MRU 2. A plurality of RUs in a same shadow pattern form one MRU. In the ascending order of frequencies, a spectrum resource shown in FIG. 15 sequentially includes the first 996-tone RU, the first 484-tone RU, the second 484-tone RU, the second 996-tone RU, and the third 996-tone RU. It can be learned that the first 996-tone RU and the second 484-tone RU are combined to form the MRU 1, and the first 484-tone RU, the second 996-tone RU, and the third 996-tone RU are combined to form the MRU 2. For example, a combination identifier corresponding to the MRU 1 is A, and a combination identifier corresponding to the MRU 2 is B.

The CC in the 802.11ax standard is used, and possible CCs corresponding to CCs in FIG. 15 are shown in Table 30.

TABLE 30

| CC 1 | N2 (A) | N0 (A) | N2 (B) | N0 (A) | N0 (B) | N0 (B) | N0 (B) | N0 (B) |
|------|--------|--------|--------|--------|--------|--------|--------|--------|
| CC 2 | N1 (A) | N0 (A) | N2 (B) | N1 (A) | N0 (B) | N0 (B) | N0 (B) | N0 (B) |

It should be noted that, when only entries of one combination identifier are defined in Table 26, for example, nine entries of the combination identifier A are defined in Table 26, one or more users can also be indicated to be allocated to some MRUs for MU-MIMO transmission. For example, a combination rule may be predefined. For example, a combination type of an MRU within 80 MHz is defined as "242+484", and a combination type of an MRU within 160 MHz is defined as "484+996". Even if there are only entries of one combination identifier, it may be determined that the combination type of the MRU within 80 MHz is "242+484", and the combination type of the MRU within 160 MHz is "484+996".

Figure 16:
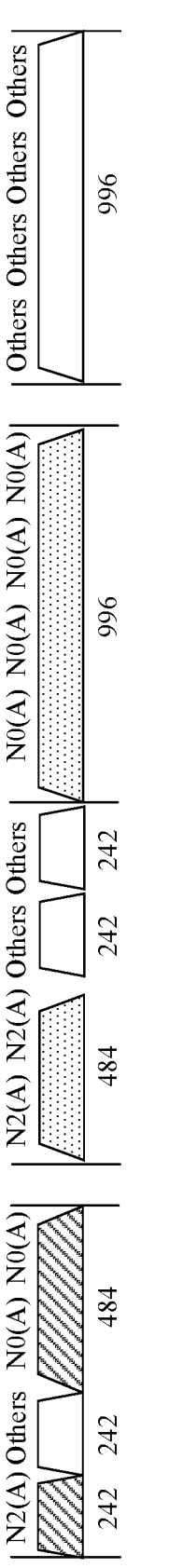
FIG. 16 is a schematic diagram of an example MRU of 320 MHz according to an embodiment of this application.

For example, refer to FIG. 16. FIG. 16 shows a spectrum resource of 320 MHz. The CC in the 802.11ax standard is used, and possible CCs corresponding to CCs in FIG. 14 are shown in Table 31.

TABLE 31

| CC 1 | N2 (A) | N0 (A) | N2 (A) | else | N0 (A) | N0 (A) | else | else |
|------|--------|--------|--------|------|--------|--------|------|------|
| CC 2 | else | N0 (A) | N2 (A) | else | N0 (A) | N0 (A) | else | else |

It can be seen that, in Table 31, entries of one combination identifier, namely, the combination identifier A, indicate MRUs included in 320 MHz. It is specified that the combination type of the MRU within 80 MHz is "242-tone RU+484-tone RU", and the combination type of the MRU within 160 MHz is "484-tone RU+996-tone RU". Therefore, even if there are only entries of the combination identifier A in Table 31, it may be determined that 320 MHz includes two MRUs, and the two MRUs are an MRU within 80 MHz whose combination type is "242-tone RU+484-tone RU" and an MRU within 160 MHz whose combination type is "484-tone RU+996-tone RU".

Similarly, a combination type of an MRU within 240 MHz or 320 MHz is defined as "484+996+996". Even if there are only entries of one combination identifier, it can be determined that the combination type of the MRU within 240 MHz or 320 MHz is "484+996+996". Alternatively, a combination type of an MRU within 320 MHz is defined as "484+996+996+996". Even if there are only entries of one combination identifier, it may be determined that a combination type of an MRU within 240 MHz or 320 MHz is "484+996+996+996".

For another example, it may be defined that 160 MHz supports one time of combination, 320 MHz supports combination within primary 160 MHz or combination within secondary 160 MHz, and 320 MHz supports one time of combination of "484-tone RU+996-tone RU+996-tone RU+996-tone RU". In this case, for an MRU that complies with the foregoing predefined combination rule, for example, at least one MRU within 320 MHz may also be indicated by using the nine entries of the combination identifier A in Table 26.

Figure 17:
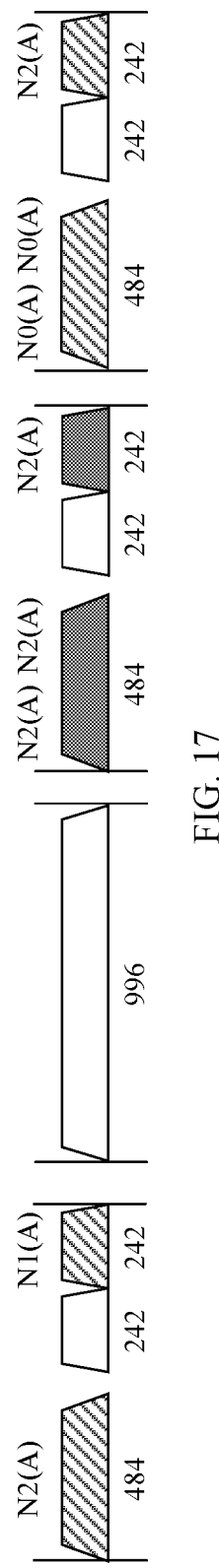
FIG. 17 is a schematic diagram of an example MRU of 320 MHz according to an embodiment of this application.

It should be further noted that different combination identifiers may also be reused. For example, refer to a 320 MHz spectrum resource shown in FIG. 17. Because a combination rule of an MRU includes that there is no cross-160 MHz combination, a combination type of "484-tone RU+242-tone RU+484-tone RU+242-tone RU" does not exist in FIG. 17. Therefore, it can be determined that the second "484-tone RU+242-tone RU" in FIG. 17 cannot be combined with the first "484-tone RU+242-tone RU". Therefore, even if an entry in Table 26 carried in a resource allocation subfield corresponding to the 242-tone RU included in the second "484-tone RU+242-tone RU" is the same as an entry carried in a resource allocation subfield corresponding to the 242-tone RU included in the first "484-tone RU+242-tone RU" in Table 26, in other words, different combination identifiers are reused, combination into an MRU shown in FIG. 16 can also be indicated.

Solution 6: An m-bit sequence in the resource allocation information table indicates a combination type of an MRU to which a corresponding 242-tone RU belongs, and a quantity of user fields that correspond to a resource unit allocation subfield corresponding to the m-bit sequence.

In other words, an entry for indicating an MRU combination type and a corresponding user field may be added to Table 1. For example, Table 32 shows possible entries for indicating an MRU combination type and a quantity of user fields in the resource allocation information table provided in this embodiment of this application. In Table 32, an example in which an index of a new entry of the resource unit allocation subfield is an m-bit sequence is used.

TABLE 32

| Index of a new entry of a resource unit allocation subfield (B7-B0) | MRU combination type | Quantity of entries |
|---|---|---|
| m-bit sequence | 242 + 242, combination into an MRU within 80 MHz | 1 * x + 1 |
| m-bit sequence | 242 + 484, combination into an MRU within 80 MHz | 1 * x + 1 |
| m-bit sequence | 242 + 242 + 996, combination into an MRU within 160 MHz | 1 * x + 1 |
| m-bit sequence | 484 + 996, combination into an MRU within 160 MHz | 1 * x + 1 |
| m-bit sequence | 242 + 484 + 996, combination into an MRU within 160 MHz | 1 * x + 1 |
| m-bit sequence | 242 + 484 + 242 + 484, combination into an MRU within 160 MHz | 1 * x + 1 |
| m-bit sequence | 484 + 996 + 996, combination into an MRU within 240 MHz | 1 * x + 1 |
| m-bit sequence | 996 + 996, combination into an MRU within 240 MHz | 1 * x + 1 |
| m-bit sequence | 996 + 996 + 996, combination into an MRU within 320 MHz | 1 * x + 1 |
| m-bit sequence | 484 + 996 + 996 + 996, combination into an MRU within 320 MHz | 1 * x + 1 |
| . . . | . . . | . . . |

It should be noted that x in Table 32 indicates a maximum quantity of users that can be supported. For example, if the maximum quantity of users is 8, x is equal to 8. For each combination type, for example, "242+242", there are nine entries, in other words, the first row in Table 32 is actually nine rows. Herein, the nine rows are combined into one row for a shorter length of the table. It should be understood that one m-bit sequence in Table 32 may indicate a specific MRU to which a corresponding 242-tone RU belongs and indicate a quantity of corresponding user fields. If an entry in Table 32 is used for a plurality of m-bit sequences, 242-tone RUs corresponding to the plurality of m-bit sequences belong to one MRU. Further, locations, in the MRU, of the 242-tone RUs corresponding to the m-bit sequences may be indicated. From this perspective, the plurality of m-bit sequences may indicate a combination type of the MRU.

For example, for an MRU within 80 MHz, for example, the MRU includes the first 242-tone RU, and a 484-tone RU including the third 242-tone RU and the fourth 242-tone RU. In this case, resource allocation subfields corresponding to the first 242-tone RU and the 484-tone RU carry the entry shown in Table 28.

The AP may indicate, by using an entry for indicating a combination type of the MRU and a quantity of user fields, one STA or more STAs to perform, for example, MU-MIMO data transmission on the MRU.

In a possible implementation, quantities of user fields corresponding to resource allocation subfields corresponding to the first 242-tone RU and the 484-tone RU may be a total quantity of users. For example, the quantity of user fields corresponding to the resource allocation subfield corresponding to the first 242-tone RU is the total quantity of users, and quantities of user fields corresponding to resource allocation subfields corresponding to the two 242-tone RUs in the 484-tone RU each are the total quantity of users.

In another possible implementation, a sum of quantities of user fields corresponding to resource allocation subfields corresponding to the first 242-tone RU and the 484-tone RU may be a total quantity of users. For example, the quantity of user fields corresponding to the resource allocation subfield corresponding to the first 242-tone RU is N1, and quantities of user fields corresponding to the two 242-tone RUs in the 484-tone RU are N2 and N3, and N1+N2+N3 equals the total quantity of users. It should be understood that, specifically, a quantity of user fields corresponding to a resource unit allocation subfield corresponding to each MRU should comply with a load balancing principle: A difference between a quantity of user fields corresponding to the CC 1 and a quantity of user fields corresponding to the CC 2 should be as small as possible. For example, the quantity of user fields corresponding to the CC 1 is the same as the quantity of user fields corresponding to the CC 2, or the CC 1 carries one more user field than the CC 2.

For example, a 320 MHz spectrum resource shown in FIG. 18 includes one MRU. The MRU belongs to RU combination within 320 MHz, and a combination type of the MRU is "484+996", which may be indicated by using one "m-bit sequence" in Table 32, and is denoted as C(484+996). The CC in the 802.11ax standard is used, and possible CCs corresponding to CCs in FIG. 18 are shown in Table 33.

TABLE 33

| CC 1 | else | C (484 + 996) | C (484 + 996) | C (484 + 996) | else | else | else | else |
|---|---|---|---|---|---|---|---|---|
| CC 2 | else | C (484 + 996) | C (484 + 996) | C (484 + 996) | else | else | else | else |

In Table 33, the third resource allocation subfield to the eighth resource allocation subfield of 16 resource allocation subfields use the entry "C(484+996)" in Table 32. It may be determined that the MRU is obtained by combining a 484-tone RU and a 996-tone RU in the first 160 MHz, and each resource allocation subfield further indicates a quantity of corresponding user fields. Therefore, a quantity of users corresponding to the MRU may be determined based on the CC 1 and the CC 2 in Table 33.

Solution 7: One m-bit sequence in the resource allocation information table indicates a combination type of an MRU, a location, in a transmission bandwidth, of each RU included in the MRU, and a quantity of user fields corresponding to a resource unit allocation subfield corresponding to the m-bit sequence.

In other words, an entry for indicating the combination type of the MRU, a location of a transmission bandwidth in which each RU included in the MRU is located, and a corresponding user field may be added to Table 1. For example, Table 34 shows possible entries for indicating a combination type of an MRU, a quantity of user fields, and a location of each RU in the MRU in the resource allocation information table provided in this embodiment of this application. In Table 34, an example in which an index of a new entry of the resource unit allocation subfield is an m-bit sequence is used.

TABLE 34

| Index of a new entry of a resource unit allocation subfield (B7-B0) | Description (entry for indicating a specific location) | Entry Quantity |
|---|---|---|
| m-bit sequence | 242 + 242, combination into an MRU within 80 MHz | 1 * x + 1 |
| m-bit sequence | 242 + 484, combination into an MRU within 80 MHz | 1 * x + 1 |
| m-bit sequence | 242 + 242 + 996, combination into an MRU within 160 MHz | 1 * x + 1 |
| m-bit sequence | 484 + 996, combination into an MRU within 160 MHz | 1 * x + 1 |
| m-bit sequence | 242 + 484 + 242 + 484, combination into an MRU within 160 MHz | 1 * x + 1 |
| m-bit sequence | 242 + 484 + 996, combination into an MRU within 160 MHz | 1 * x + 1 |
| m-bit sequence | 996 + 996, combination into an MRU within 240 MHz | 2 * (x + 1) |
| m-bit sequence | 484 + 996 + 996, combination into an MRU within 240 MHz | 1 * x + 1 |
| m-bit sequence | 242 + 484 + 996 + 996, combination into an MRU within 240 MHz | 1 * x + 1 |
| m-bit sequence | 996 + 996 + 996, combination into an MRU within 320 MHz | 3 * (x + 1) |
| m-bit sequence | 484 + 996 + 996 + 996, combination into an MRU within 320 MHz | 1 * x + 1 |
| . . . | . . . | . . . |

The m-bit sequence in Table 34 indicates a combination type of the MRU, for example, "242+242", which may be denoted as C(242+242). In addition, the m-bit sequence may further indicate a location, in a transmission bandwidth, of each RU (for example, of two 242-tone RUs) in the MRU. For example, the m-bit sequence in Table 34 may be denoted as C(242+242), where an underlined RU may indicate a location, in a transmission bandwidth, of an RU that is not underlined. x indicates a maximum quantity of users that can be supported. For example, if the maximum quantity of users is 8, x is equal to 8. For each combination type, for example, "996+996", there are actually "2*(x+1)" entries, in other words, the first row in Table 34 is actually 2*(x+1) rows. Herein, the 2*(x+1) rows are combined into one row for a shorter length of the table.

For example, for an MRU within 80 MHz, a combination type of the MRU is "242+484". In this case, if the entry in Table 33 indicates combination into the MRU, the entry indicating the combination type "242+484" should appear three times: The entry appears once in the first 40 MHz of 80 MHz, and appears twice in the second 40 MHz of 80 MHz, as shown in Table 35.

TABLE 35

| CC 1 | else | C(242 + 484) | C(242 + 484) | C(242 + 484) |
|---|---|---|---|---|
| CC 2 | else | C(242 + 484) | C(242 + 484) | C(242 + 484) |

If the entry in the first 40 MHz is "C(242+484)", that is, Table 34 is Table 36, it may be determined that the 242-tone RU is located in the first 40 MHz, and the 484-tone RU is located in the second 40 MHz. In other words, the location, in the transmission bandwidth, of the 484-tone RU may be indicated by using the location of the 242-tone RU, so that locations of both the RUs included in the MRU can be indicated.

TABLE 36

| CC 1 | else | C(242 + 484) | C(242 + 484) | C(242 + 484) |
|---|---|---|---|---|
| CC 2 | else | C(242 + 484) | C(242 + 484) | C(242 + 484) |

For another example, for an MRU within 320 MHz, a combination type of the MRU is "996+996+996", which may be denoted as C(996+996+996). If the entry in Table 34 is used, there may be C(996+996+996), C(996+996+996), or C(996+996+996). However, resource allocation subfields corresponding to different 996-tone RUs use different entries indicating "996+996+996" in Table 34, so that locations of three 996-tone RUs included in the MRU can be indicated.

For example, a 320 MHz spectrum resource shown in FIG. 18 includes one MRU. The MRU belongs to RU combination within 320 MHz, and a combination type of the MRU is "484+996", which may be indicated by using one "m-bit sequence" in Table 33, and is denoted as C(484+996). The CC in the 802.11ax standard is used, and possible CCs corresponding to CCs in FIG. 18 are shown in Table 37.

TABLE 37

| CC 1 | else | C (484 + 996) | C (484 + 996) | C (484 + 996) | else | else | else | else |
|---|---|---|---|---|---|---|---|---|
| CC 2 | else | C (484 + 996) | C (484 + 996) | C (484 + 996) | else | else | else | else |

In Table 37, the third resource allocation subfield to the eighth resource allocation subfield of the 16 resource allocation subfields use the entry "C(484+996)" in Table 32. It may be determined that the MRU is obtained by combining a 484-tone RU and a 996-tone RU in the first 160 MHz, a location of the 484-tone RU is in the second 40 MHz, and the 996-tone RU is in the second 80 MHz.

In a possible scenario, different users support different transmission bandwidths. For example, some users can obtain only RU information of the first 80 MHz, and some other users can obtain only RU information of the second 80 MHz. In other words, a resource unit allocation subfield of each segment may include only a frequency band of the segment. Therefore, when there is cross-segment RU combination, the solution 7 may fail to implement MRU combination indication.

Therefore, in this embodiment of this application, a resource allocation information table may be constructed. One m-bit sequence in the table may indicate a location, in a transmission bandwidth, of each RU included in the MRU, and a quantity of user fields corresponding to a resource unit allocation subfield corresponding to the m-bit sequence. A difference between the resource allocation information table in this solution and the resource allocation information table in solution 7 lies in that an RU corresponding to the m-bit sequence in this solution is an RU on which cross-segment combination needs to be performed, in other words, an underlined RU in Table 33 is an RU on which cross-chip combination needs to be performed.

For example, Table 38 shows possible entries for indicating a combination type of an MRU, a quantity of user fields, and a location, in a transmission bandwidth, of each RU in the MRU in the resource allocation information table provided in this embodiment of this application. In Table 38, an example in which an index of a new entry of the resource unit allocation subfield is an m-bit sequence is used.

TABLE 38

| Index of a new entry of a resource unit allocation subfield (B7-B0) | Description (entry for indicating a combination type) | Quantity of entries |
|---|---|---|
| m-bit sequence | 484 + 996, combination of large RUs within 160 MHz | 1 * x + 1 |
| m-bit sequence | 484 + 996, combination of large RUs within 160 MHz | 2 * (x + 1) |
| . . . | . . . | . . . |

"484+996" is used as an example. If an 80 MHz segment in which the user is located does not have a 484-tone RU to be combined, an MRU combination indication cannot be implemented by using Table 34. However, this may be indicated by using the entry "484+996" in Table 38.

This embodiment of this application provides solutions of the solution 1 to the solution 7. MRU combination indication can be implemented by using any one of the solutions, and indication of combination types of more MRUs is supported, so that RU allocation is more flexible.

In the foregoing embodiments of this application, the method provided in the embodiments of this application is described separately from perspectives of an AP, a STA, and interaction between an AP and a STA. To implement functions in the foregoing methods provided in embodiments of this application, terminals and network devices may include a hardware structure and/or a software module, to implement the foregoing functions in a form of the hardware structure, the software module, or a combination of the hardware structure and the software module.

The following describes, with reference to the accompanying drawings, communication apparatuses configured to implement the foregoing method in embodiments of this application. Therefore, all the foregoing content may be used in the following embodiments. Repeated content is not described again.

FIG. 19 is a schematic diagram of a structure of a communication apparatus 1900. The communication apparatus 1900 may correspondingly implement functions or steps implemented by the transmit end (for example, the AP) or the receive end (for example, the STA) in the foregoing method embodiments. The communication apparatus may include a transceiver unit 1910 and a processing unit 1920. Optionally, the communication apparatus may further include a storage unit. The storage unit may be configured to store instructions (code or a program) and/or data. The transceiver unit 1910 and the processing unit 1920 may be coupled to the storage unit. For example, the processing unit 1920 may read the instructions (the code or the program) and/or the data in the storage unit, to implement a corresponding method. The foregoing units may be disposed independently, or may be partially or completely integrated. For example, the transceiver unit 1910 may be integrated by a sending unit and a receiving unit.

In some possible implementations, the communication apparatus 1900 can correspondingly implement behavior and functions of the STA in the foregoing method embodiments. For example, the communication apparatus 1900 may be a STA, or may be a component (for example, a chip or a circuit) used in the STA. The transceiver unit 1910 may be configured to perform all receiving or sending operations performed by the STA in the embodiment shown in FIG. 5, FIG. 9, or FIG. 13, for example, S502 in the embodiment shown in FIG. 5, and/or configured to support another process of the technology described in this specification; for another example, S902 in the embodiment shown in FIG. 9, and/or configured to support another process of the technology described in this specification; or for another example, S1302 in the embodiment shown in FIG. 13, and/or configured to support another process of the technology described in this specification. The processing unit 1920 is configured to perform all other operations than a receiving or sending operation that are performed by the STA in the embodiment as shown in FIG. 5, FIG. 9, or FIG. 13, for example, S501 in the embodiment shown in FIG. 5, and/or configured to support another process of the technology described in this specification; for another example, S901 in the embodiment shown in FIG. 9, and/or configured to support another process of the technology described in this specification; or for another example, S1301 in the embodiment shown in FIG. 13, and/or configured to support another process of the technology described in this specification.

For example, the transceiver unit 1910 is configured to receive a physical layer protocol data unit PPDU sent by a transmit end, where the PPDU includes a resource unit allocation subfield, and the resource unit allocation subfield indicates an MRU to which a 242-tone RU corresponding to the resource unit allocation subfield belongs, and further indicates a quantity of user fields corresponding to the resource unit allocation subfield.

The processing unit 1920 is configured to determine the MRU based on the PPDU.

For another example, the transceiver unit 1910 is configured to receive a PPDU from an AP. The PPDU includes first indication information and second indication information. The first indication information indicates 80 MHz in which an RU to be combined with a 996-tone RU is located. The second indication information indicates a quantity of user fields corresponding to the MRU. The MRU is obtained by combining the 996-tone RU and the to-be-combined RU in 80 MHz.

The processing unit 1920 is configured to determine, based on the first indication information and the second indication information, the MRU to which the STA belongs.

For another example, the transceiver unit 1910 is configured to receive a PPDU from an AP. The PPDU includes first indication information and second indication information. The first indication information indicates a combination type of a multi-resource unit MRU allocated to P stations STAs. The second indication information indicates a quantity of user fields included in the PPDU. The MRU is obtained by combining at least two resource units RUs. Any one of the at least two RUs is an RU greater than or equal to a 242-tone RU. P is greater than or equal to 0.

The processing unit 1920 is configured to determine, based on the first indication information and the second indication information, the MRU to which the STA belongs.

For example, the transceiver unit 1910 is configured to receive a PPDU from an AP. The PPDU includes M resource allocation subfields. Each resource allocation subfield indicates a combination type of an MRU to which a corresponding 242-tone RU belongs and a quantity of corresponding user fields. M is a quantity of resource allocation subfields corresponding to the MRU. The MRU is obtained by combining at least two resource units RUs. Any one of the at least two RUs is an RU greater than or equal to a 242-tone RU.

The processing unit 1920 is configured to determine the MRU based on the PPDU.

In some possible implementations, the communication apparatus 1900 can correspondingly implement behavior and functions of the STA in the foregoing method embodiments. For example, the communication apparatus 1900 may be an AP, or may be a component (for example, a chip or a circuit) used in the AP. The transceiver unit 1910 may be configured to perform all receiving or sending operations performed by the AP in the embodiment shown in FIG. 5, FIG. 9, or FIG. 13, for example, S502 in the embodiment shown in FIG. 5, and/or configured to support another process of the technology described in this specification; for another example, S902 in the embodiment shown in FIG. 9, and/or configured to support another process of the technology described in this specification; or for another example, S1302 in the embodiment shown in FIG. 13, and/or configured to support another process of the technology described in this specification. The processing unit 1920 is configured to perform all other operations than a receiving or sending operation that are performed by the AP in the embodiment as shown in FIG. 5, FIG. 9, or FIG. 13, for example, S503 in the embodiment shown in FIG. 5, and/or configured to support another process of the technology described in this specification; for another example, S903 in the embodiment shown in FIG. 9, and/or configured to support another process of the technology described in this specification; or for another example, S1203 in the embodiment shown in FIG. 12, and/or configured to support another process of the technology described in this specification.

For example, the processing unit 1920 is configured to generate a PPDU. The PPDU includes a resource unit allocation subfield, and the resource unit allocation subfield indicates an MRU to which a 242-tone RU corresponding to the resource unit allocation subfield belongs, and further indicates a quantity of user fields corresponding to the resource unit allocation subfield.

The transceiver unit 1910 is configured to send the PPDU.

For another example, the processing unit 1920 is configured to generate a PPDU. The PPDU includes first indication information and second indication information. The first indication information indicates 80 MHz in which an RU to be combined with a 996-tone RU is located. The second indication information indicates a quantity of user fields corresponding to the MRU. The MRU is obtained by combining the 996-tone RU and the to-be-combined RU in 80 MHz.

The transceiver unit 1910 is configured to send the PPDU.

For another example, the processing unit 1920 is configured to generate a PPDU. The first indication information indicates a combination type of a multi-resource element MRU. The second indication information indicates a quantity of user fields corresponding to the MRU. The MRU is obtained by combining at least two resource units RUs. Any one of the at least two RUs is an RU greater than or equal to a 242-tone RU. P is greater than or equal to 0.

The transceiver unit 1910 is configured to send the PPDU.

For another example, the processing unit 1920 is configured to generate a PPDU. The PPDU includes M resource allocation subfields. Each resource allocation subfield indicates a combination type of an MRU to which a corresponding 242-tone RU belongs and a quantity of corresponding user fields. M is a quantity of resource allocation subfields corresponding to the MRU. The MRU is obtained by combining at least two resource units RUs. Any one of the at least two RUs is an RU greater than or equal to a 242-tone RU.

The transceiver unit 1910 is configured to send the PPDU.

FIG. 20 shows a communication apparatus 2000 according to an embodiment of this application. The communication apparatus 2000 may be a STA, and may implement a function of the STA in the methods provided in the embodiments of this application. Alternatively, the communication apparatus 2000 may be an AP, and may implement a function of the AP in the methods provided in the embodiments of this application. Alternatively, the communication apparatus 2000 may be an apparatus that may support a STA to implement a corresponding function in the methods provided in the embodiments of this application, or may be an apparatus that may support an AP to implement a corresponding function in the methods provided in the embodiments of this application. The communication apparatus 2000 may be a chip system. In this embodiment of this application, the chip system may include a chip, or may include a chip and another discrete component.

In some embodiments, the communication apparatus 2000 may include a communication interface 2010, configured to communicate with another device through a transmission medium, so that an apparatus in the communication apparatus 2000 may communicate with the another device. For example, when the communication apparatus is a STA, the another device is an AP; or when the communication apparatus is an AP, the another device is a STA. The communication interface 2010 may be specifically a transceiver. In hardware implementation, the communication unit 2010 may be a transceiver, and the transceiver is integrated into the communication apparatus 2000 as the communication interface 2010.

The communication apparatus 2000 further includes at least one processor 2020. The processor 2020 may receive and send data by using the communication interface 2010, to implement or support the communication apparatus 2000 to implement the functions of the STA or the AP in the method provided in the embodiments of this application. For example, the communication apparatus 2000 can correspondingly implement behavior and functions of the STA in the foregoing method embodiments.

The communication interface 2010 may be configured to perform all receiving or sending operations performed by the STA in the embodiment shown in FIG. 5, FIG. 9, or FIG. 13, for example, S502 in the embodiment shown in FIG. 5, and/or configured to support another process of the technology described in this specification; for another example, S902 in the embodiment shown in FIG. 9, and/or configured to support another process of the technology described in this specification; or for another example, S1302 in the embodiment shown in FIG. 13, and/or configured to support another process of the technology described in this specification. The at least one processor 2020 is configured to perform all other operations than a receiving or sending operation that are performed by the STA in the embodiment as shown in FIG. 5, for example, S501 in the embodiment shown in FIG. 5, and/or configured to support another process of the technology described in this specification; for another example, S901 in the embodiment shown in FIG. 9, and/or configured to support another process of the technology described in this specification; or for another example, S1301 in the embodiment shown in FIG. 13, and/or configured to support another process of the technology described in this specification.

For example, the communication apparatus 2000 can correspondingly implement behavior and functions of the AP in the foregoing method embodiments. The communication interface 2010 may be configured to perform all receiving or sending operations performed by the AP in the embodiment shown in FIG. 5, FIG. 9, or FIG. 13, for example, S502 in the embodiment shown in FIG. 5, and/or configured to support another process of the technology described in this specification; for another example, S902 in the embodiment shown in FIG. 9, and/or configured to support another process of the technology described in this specification; or for another example, S1302 in the embodiment shown in FIG. 13, and/or configured to support another process of the technology described in this specification. The at least one processor 2020 is configured to perform all other operations than a receiving or sending operation that are performed by the AP in the embodiment as shown in FIG. 5, FIG. 9, or FIG. 13, for example, S503 in the embodiment shown in FIG. 5, and/or configured to support another process of the technology described in this specification; for another example, S903 in the embodiment shown in FIG. 9, and/or configured to support another process of the technology described in this specification; or for another example, S1303 in the embodiment shown in FIG. 13, and/or configured to support another process of the technology described in this specification.

In some other embodiments, the communication apparatus 2000 may further include at least one memory 2030, configured to store program instructions and/or data. The memory 2030 is coupled to the processor 2020. The coupling in this embodiment of this application may be an indirect coupling or a communication connection between apparatuses, units, or modules in an electrical form, a mechanical form, or another form, and is used for information exchange between the apparatuses, the units, or the modules. The processor 2020 may operate with the memory 2030. The processor 2020 may execute the program instructions and/or the data stored in the memory 2030, so that the communication apparatus 2000 implements corresponding methods. At least one of the at least one memory may be included in the processor.

In this embodiment of this application, a specific connection medium between the communication interface 2010, the processor 2020, and the memory 2030 is not limited. In this embodiment of this application, the memory 2030, the processor 2020, and the communication interface 2010 are connected through a bus 2040 in FIG. 20, and the bus is indicated by a thick line in FIG. 20. A connection manner between other components is merely an example for description, and is not limited thereto. The bus may be classified into an address bus, a data bus, a control bus, and the like. For ease of expression, the bus is indicated by only a bold line in FIG. 20, which does not mean that only one bus or one type of bus exists.

In this embodiment of this application, the processor 2020 may be a general-purpose processor, a digital signal processor, an application-specific integrated circuit, a field programmable gate array or another programmable logic device, a discrete gate or transistor logic device, or a discrete hardware component. The processor can implement or execute the methods, steps, and logical block diagrams disclosed in embodiments of this application. The general-purpose processor may be a microprocessor or any conventional processor or the like. The steps of the method disclosed with reference to embodiments of this application may be directly performed by a hardware processor, or may be performed by using a combination of hardware in the processor and a software module.

In embodiments of this application, the memory 2030 may be a non-volatile memory, such as a hard disk drive (HDD) or a solid-state drive (SSD), or may be a volatile memory, such as a random access memory (RAM). The memory is any other medium that can carry or store expected program code in a form of an instruction or a data structure and that can be accessed by a computer, but is not limited thereto. The memory in embodiments of this application may alternatively be a circuit or any other apparatus that can implement a storage function, and is configured to store the program instructions and/or the data.

It should be noted that the communication apparatus in the foregoing embodiment may be a STA or an AP, a circuit, or a chip used in the STA or AP, or may be another combined component or component that has functions of the STA or AP. When the communication apparatus is the STA or AP, the transceiver unit 1910 may be the transceiver, and may include an antenna, a radio frequency circuit, and the like. The processing module may be the processor, for example, a central processing unit (CPU). When the communication apparatus is the component that has functions of the STA or AP, the transceiver unit 1910 may be a radio frequency unit, and the processing module may be the processor. When the communication apparatus is the chip system, the transceiver unit 1910 may be an input/output interface of the chip system, and the processing module may be a processor of the chip system.

As a possible product form, the AP or STA described in this embodiment of this application may further be implemented by using the following components: one or more FPGAs (field programmable gate arrays), a PLD (programmable logic device), a controller, a state machine, gate logic, a discrete hardware component, any other suitable circuit, or any combination of circuits that can perform various functions described in this application.

It should be understood that the APs in various product forms have any function of the AP in the foregoing method embodiments. Details are not described herein again. The STAs in various forms have any function of the STA in the foregoing method embodiments. Details are not described herein again.

An embodiment of this application further provides a communication system. Specifically, the communication system includes a STA and an AP, or may further include more APs and access network devices. For example, the communication system includes a STA and an AP that are configured to implement a related function in FIG. 6 or FIG. 9.

The AP is separately configured to implement related functions of the network parts in FIG. 5 or FIG. 12. The STA is configured to implement related functions of the STA in FIG. 5 or FIG. 12. For example, the STA may perform S502 and S503 in the embodiment shown in FIG. 5. The AP may perform S501 and S502 in the embodiment shown in FIG. 5. For another example, the STA may perform, for example, S1202 and S1203 in the embodiment shown in FIG. 12. The AP may perform S1201 and S1202 in the embodiment shown in FIG. 12.

An embodiment of this application further provides a computer-readable storage medium, including instructions. When the instructions are run on a computer, the computer is enabled to perform the method performed by the AP or STA in FIG. 5 or FIG. 12.

An embodiment of this application further provides a computer program product, including computer program code. When the computer program code is run on a computer, the computer is enabled to perform the method performed by the AP or the STA in FIG. 5 or FIG. 12.

An embodiment of this application provides a chip system. The chip system includes a processor and may further include a memory, and is configured to implement a function of the AP or STA in the foregoing methods. The chip system may include a chip, or may include a chip and another discrete component.

An embodiment of this application further provides a communication apparatus, including a processor and an interface. The processor is configured to perform the information processing method in any one of the foregoing method embodiments.

It should be understood that the communication apparatus may be a chip. The processor may be implemented by hardware, or may be implemented by software. When the processor is implemented by the hardware, the processor may be a logic circuit, an integrated circuit, or the like. When the processor is implemented by the software, the processor may be a general-purpose processor. The general-purpose processor is implemented by reading software code stored in a memory. The memory may be integrated into the processor, or may be located outside the processor and exist independently.

All or some of the methods in embodiments of this application may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on the computer, the procedure or functions according to embodiments of the present invention are all or partially generated. The computer may be a general-purpose computer, a dedicated computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL for short)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD for short)), a semiconductor medium (for example, an SSD), or the like.

It is clearly that, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A resource unit combination indication method comprising:

generating, by an access point transmit end, a physical layer protocol data unit (PPDU), wherein the PPDU comprises a resource unit allocation subfield, and the resource unit allocation subfield indicates a multi-resource unit (MRU) to which a 242-tone resource unit (RU) corresponding to the resource unit allocation subfield belongs, and wherein the MRU includes a plurality of RUs;

sending, by the access point transmit end, the PPDU;

wherein the resource unit allocation subfield corresponding to the MRU further indicates a combination type of the MRU and a quantity of user fields corresponding to the resource unit allocation subfield; and wherein the combination type of the MRU is carried in first indication information, and the quantity of user fields is carried in second indication information; and wherein the first indication information is carried in a resource allocation subfield corresponding to a first RU that firstly appears in the plurality of RUs included in the MRU, and the second indication information is carried in a resource allocation subfield corresponding to an RU other than the first RU in the MRU.

2. The method according to claim 1, wherein that the resource unit allocation subfield indicates the MRU to which the 242-tone RU corresponding to the resource unit allocation subfield belongs comprises:

the resource unit allocation subfield indicates a combination identifier of the MRU to which the 242-tone RU corresponding to the resource unit allocation subfield belongs.

3. The method according to claim 2, wherein combination identifiers of different MRUs are the same or different, and at least two MRUs with different combination identifiers exist between two MRUs with a same combination identifier.

4. The method according to claim 2, wherein different MRUs do not overlap, at least a third MRU exists between a first MRU and a second MRU that have a same combination identifier, and a combination identifier of the third MRU is different from the same combination identifier of the first MRU or the second MRU.

5. The method according to claim 1, wherein different MRUs are identified by combination identifiers;

based on a combination identifier of at least two of the different MRUs being the same, the same combination identifier is reused.

6. The method according to claim 1, wherein every two of the user fields are in one group, which is followed by a cyclic redundancy code (CRC) and a tail field except in a final group, wherein the final group includes one or two of the user fields.

7. The method according to claim 6, wherein a tail field following the final group of the user fields is followed by a padding field.

8. A resource unit combination indication method comprising:

receiving, by a station receive end, a physical layer protocol data unit (PPDU) from a transmit end, wherein the PPDU comprises a resource unit allocation subfield, and the resource unit allocation subfield indicates a multi-resource unit (MRU) to which a 242-tone resource unit (RU) corresponding to the resource unit allocation subfield belongs, and wherein the MRU includes a plurality of RUs;

determining, by the station receive end, the MRU based on the PPDU;

wherein the resource unit allocation subfield corresponding to the MRU further indicates a combination type of the MRU and a quantity of user fields corresponding to the resource unit allocation subfield; and wherein the combination type of the MRU is carried in first indication information, and the quantity of user fields is carried in second indication information; and wherein the first indication information is carried in a resource allocation subfield corresponding to a first RU that firstly appears in the plurality of RUs included in the MRU, and the second indication information is carried in a resource allocation subfield corresponding to an RU other than the first RU in the MRU.

9. The method according to claim 8, wherein that the resource unit allocation subfield indicates the MRU to which the 242-tone RU corresponding to the resource unit allocation subfield belongs comprises:

the resource unit allocation subfield indicates a combination identifier of the MRU to which the 242-tone RU corresponding to the resource unit allocation subfield belongs.

10. The method according to claim 9, wherein combination identifiers of different MRUs are the same or different, and at least two MRUs with different combination identifiers exist between two MRUs with a same combination identifier.

11. The method according to claim 9, wherein different MRUs do not overlap, at least a third MRU exists between a first MRU and a second MRU that have a same combination identifier, and a combination identifier of the third MRU is different from the same combination identifier of the first MRU or the second MRU.

12. The method according to claim 8, wherein different MRUs are identified by combination identifiers;

based on a combination identifier of at least two of the different MRUs being the same, the same combination identifier is reused.

13. The method according to claim 8, wherein every two of the user fields are in one group, which is followed by a cyclic redundancy code (CRC) and a tail field except in a final group, wherein the final group includes one or two of the user fields.

14. The method according to claim 13, wherein a tail field following the final group of the user fields is followed by a padding field.

15. A communication apparatus comprising:

a transceiver, configured to cooperate with a processor to generate a physical layer protocol data unit (PPDU), wherein the PPDU comprises a resource unit allocation subfield, and the resource unit allocation subfield indicates a multi-resource unit (MRU) to which a 242-tone resource unit (RU) corresponding to the resource unit allocation subfield belongs, and wherein the MRU includes a plurality of RUs;

the processor, configured to be used by a transmit end to send the PPDU;

wherein the resource unit allocation subfield corresponding to the MRU further indicates a combination type of the MRU and a quantity of user fields corresponding to the resource unit allocation subfield; and wherein the combination type of the MRU is carried in first indication information, and the quantity of user fields is carried in second indication information; and wherein the first indication information is carried in a resource allocation subfield corresponding to a first RU that firstly appears in the plurality of RUs included in the MRU, and the second indication information is carried in a resource allocation subfield corresponding to an RU other than the first RU in the MRU.

16. The communication apparatus according to claim 15, wherein that the resource unit allocation subfield indicates the MRU to which the 242-tone RU corresponding to the resource unit allocation subfield belongs comprises:

the resource unit allocation subfield indicates a combination identifier of the MRU to which the 242-tone RU corresponding to the resource unit allocation subfield belongs.

17. The communication apparatus according to claim 16, wherein combination identifiers of different MRUs are the same or different, and at least two MRUs with different combination identifiers exist between two MRUs with a same combination identifier.

18. The communication apparatus according to claim 16, wherein different MRUs do not overlap, at least a third MRU exists between a first MRU and a second MRU that have a same combination identifier, and a combination identifier of the third MRU is different from the same combination identifier of the first MRU or the second MRU.

19. The communication apparatus according to claim 15, wherein different MRUs are identified by combination identifiers;

based on a combination identifier of at least two of the different MRUs being the same, the same combination identifier is reused.

20. The communication apparatus according to claim 15, wherein every two of the user fields are in one group, which is followed by a cyclic redundancy code (CRC) and a tail field except in a final group, wherein the final group includes one or two of the user fields.

* * * * *